(12) United States Patent
Huang et al.

(10) Patent No.: US 8,694,270 B2
(45) Date of Patent: Apr. 8, 2014

(54) ULTRASONIC CLAMP-ON MULTIPHASE FLOWMETER

(75) Inventors: Songming Huang, Hardwick (GB); Ian Atkinson, Ely (GB); Cheng-gang Xie, Sawston (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 614 days.

(21) Appl. No.: 12/682,317

(22) PCT Filed: Nov. 24, 2008

(86) PCT No.: PCT/GB2008/003902
§ 371 (c)(1),
(2), (4) Date: Jul. 16, 2010

(87) PCT Pub. No.: WO2009/071870
PCT Pub. Date: Jun. 11, 2009

(65) Prior Publication Data
US 2010/0299088 A1   Nov. 25, 2010

Related U.S. Application Data

(60) Provisional application No. 60/992,575, filed on Dec. 5, 2007.

(51) Int. Cl.
*G01F 1/66* (2006.01)
(52) U.S. Cl.
USPC .......................................................... 702/48
(58) Field of Classification Search
CPC . G01F 1/66; G01F 1/663; G01N 2291/02836; G01P 21/025
USPC ........... 702/45, 48, 49, 54, 75, 142, 151, 159, 702/168, 171, 172; 73/627, 861.25, 861.48
See application file for complete search history.

(56) References Cited

U.S. PATENT DOCUMENTS 3,038,738 A   2/1976   Nagel at al.
4,044,943 A   8/1977   Brown et al.
(Continued)

FOREIGN PATENT DOCUMENTS

EP   0076882 A1   4/1983
EP   0254160 A1   1/1988
(Continued)

OTHER PUBLICATIONS

Official Action of Russian Application No. 201027231 received Dec. 27, 2012: pp. 1-4.
(Continued)

*Primary Examiner* — Mohamed Charioui

(57) ABSTRACT

A multiphase flowmeter for determining at least one characteristic of a first phase flowing in a pipe with at least a second phase being also present in the pipe is disclosed. The multiphase flowmeter includes a processor configured to determine the at least one characteristic of the first phase, a first transducer configured to emit a first pulse signal into the first phase at a first incident angle with respect to a straight line that is perpendicular to an interior pipe wall; the first pulse signal is in an ultrasonic range and is configured to be coupled to an exterior pipe wall; and the absolute value of the first incident angle in the first phase is configured to be at least 10 degrees and at most 80 degrees and a second transducer configured to emit a second pulse signal into the first phase at a substantially normal incidence.

15 Claims, 22 Drawing Sheets

(56) References Cited

U.S. PATENT DOCUMENTS

| | | | |
|---|---|---|---|
| 4,232,549 A | 11/1980 | Migrin et al. | |
| 4,282,751 A | 8/1981 | Brown et al. | |
| 4,312,234 A | 1/1982 | Rhodes et al. | |
| 4,467,659 A | 8/1984 | Baumoel | |
| 4,829,831 A | 5/1989 | Kefer et al. | |
| 4,856,344 A | 8/1989 | Hunt | |
| 5,007,293 A | 4/1991 | Jung | |
| 5,203,211 A | 4/1993 | Jung | |
| 5,251,490 A | 10/1993 | Kronberg | |
| 5,287,752 A | 2/1994 | Den Boer | |
| 5,396,807 A | 3/1995 | Dowty et al. | |
| 5,400,657 A | 3/1995 | Kolpak et al. | |
| 5,463,906 A | 11/1995 | Spani et al. | |
| 5,485,743 A | 1/1996 | Taherian et al. | |
| 5,501,099 A | 3/1996 | Whorff | |
| 5,591,922 A | 1/1997 | Segeral et al. | |
| 5,654,502 A | 8/1997 | Dutton | |
| 5,693,891 A | 12/1997 | Brown et al. | |
| 5,719,329 A | 2/1998 | Jepson et al. | |
| 5,793,216 A | 8/1998 | Constant | |
| 5,905,208 A | 5/1999 | Ortiz et al. | |
| 6,058,787 A | 5/2000 | Hughes | |
| 6,067,861 A * | 5/2000 | Shekarriz et al. | 73/861.25 |
| 6,284,023 B1 | 9/2001 | Torkildsen et al. | |
| 6,575,043 B1 | 6/2003 | Huang et al. | |
| 6,622,574 B2 | 9/2003 | Fincke | |
| 6,655,221 B1 | 12/2003 | Aspelund et al. | |
| 6,719,048 B1 | 4/2004 | Ramos et al. | |
| 6,758,100 B2 * | 7/2004 | Huang | 73/861.25 |
| 6,776,054 B1 | 8/2004 | Stephenson et al. | |
| 6,831,470 B2 | 12/2004 | Xie et al. | |
| 7,327,146 B2 | 2/2008 | Simon | |
| 7,454,981 B2 | 11/2008 | Gysling | |
| 7,562,587 B2 | 7/2009 | Atkinson et al. | |
| 7,607,358 B2 | 10/2009 | Atkinson et al. | |
| 7,650,799 B2 | 1/2010 | Atkinson et al. | |
| 7,673,525 B2 | 3/2010 | Huang | |
| 7,908,930 B2 | 3/2011 | Xie et al. | |
| 7,987,733 B2 | 8/2011 | Atkinson et al. | |
| 8,027,794 B2 | 9/2011 | Xie | |
| 2005/0229716 A1 | 10/2005 | Unsworth et al. | |
| 2006/0144148 A1 * | 7/2006 | Gysling et al. | 73/597 |
| 2007/0157737 A1 | 7/2007 | Gysling et al. | |
| 2008/0163692 A1 * | 7/2008 | Huang et al. | 73/627 |
| 2011/0098938 A1 | 4/2011 | Huang et al. | |
| 2011/0112773 A1 | 5/2011 | Atkinson | |

FOREIGN PATENT DOCUMENTS

| | | | |
|---|---|---|---|
| EP | 0605944 | * | 10/1993 |
| EP | 0605944 | | 7/1994 |
| GB | 1217579 | A | 12/1970 |
| GB | 2152213 | A | 7/1985 |
| GB | 2177803 | A | 1/1987 |
| GB | 2238615 | A | 6/1991 |
| GB | 2279146 | A | 12/1994 |
| GB | 2300265 | A | 10/1996 |
| GB | 2325736 | A | 12/1998 |
| GB | 2343249 | A | 5/2000 |
| GB | 2343249 | B | 1/2001 |
| GB | 2363455 | A | 12/2001 |
| GB | 2359435 | B | 5/2002 |
| GB | 2363455 | B | 10/2002 |
| GB | 2376074 | A | 12/2002 |
| GB | 2406386 | A | 3/2005 |
| GB | 2420299 | A | 5/2006 |
| GB | 2447490 | A | 5/2009 |
| GB | 2454256 | A | 5/2009 |
| SU | 1337667 | A1 | 9/1987 |
| WO | 8902066 | A1 | 3/1989 |
| WO | 9108444 | A1 | 6/1991 |
| WO | 9533980 | A1 | 12/1995 |
| WO | WO9724585 | * | 12/1996 |
| WO | 9724585 | A1 | 7/1997 |
| WO | 0003207 | A1 | 1/2000 |
| WO | 0043736 | | 7/2000 |
| WO | 0123845 | A1 | 4/2001 |
| WO | 2004106861 | A2 | 12/2004 |
| WO | 2005031311 | A1 | 4/2005 |
| WO | 2005040732 | A1 | 5/2005 |
| WO | 2007105961 | A1 | 9/2007 |
| WO | 2007129897 | A1 | 11/2007 |
| WO | 2008029025 | A1 | 3/2008 |
| WO | 2008084182 | A1 | 7/2008 |
| WO | 2008110805 | A1 | 9/2008 |
| WO | 2009037434 | A1 | 3/2009 |
| WO | 2009037435 | | 3/2009 |
| WO | 2009056841 | A1 | 5/2009 |
| WO | 2009101392 | A1 | 8/2009 |
| WO | 2009112834 | A1 | 9/2009 |

OTHER PUBLICATIONS

Asher, R. C., "Aerosols," Ultrasonic Sensors for Chemical and Process Plant, Sensors Series, 1997, Institute of Physics Publishing, Bristol and Philadelphia: Section A.5.7, pp. 351.

Asher, R. C. "Attenuation in Two-phase Fluid Systems," Ultrasonic Sensors for Chemical and Process Plant, Sensors Series; 1997, Institute of Physics Publishing, Bristol and Philadelphia: Section B.6, pp. 365-373.

Atkinson et al., "New Generation Multiphase Flowmeters from Schlumberger and Framo Engineering AS," 17th International North Sea Flow Measurement Workshop, Oct. 1999: pp. 154-165.

Batchelor, G. K., "Steady Axisymmetric Flow with Swirl," An Introduction to Fluid Dynamics, 2000, Cambridge University Press, Section 7.5: pp. 543-555.

Beckman, M., "Wetter Isn't Better," Flow Meter Directory, INEEL Research Communications, Feb. 24, 2002, Retrieved Feb. 20, 2012, <http://www.flowmeterdirectory.com/flowmeter_artc_02022401.html>.

Bondett De La Bernardie et al., "Low (10-800 MHz) and High (40 GHz) Frequency Probes Applied to Petroleum Multiphase Flow Characterization" Measurement Science and Technology, May 2008, vol. 19: pp. 1-8.

Clark, W. W., "Liquid Film Thickness Measurement," Multiphase Science and Technology, 2002, vol. 14(1): pp. 1-74.

Constant et al., "Multiphase Metering Using Ultrasonics as an Alternative Approach," Documentation of Multiphase Metering Conference, Mar. 1997: pp. 1-15.

"Daniel Senior Sonic™ 4-Path Gas Flow Meter," Emerson Process Management Product Information, Copyright 2011 Emerson Electric Company, Retrieved Feb. 20, 2012, <http://www2.emersonprocess.com/en-US/brands/daniel/Flow/ultrasonics/Pages/Ultrasonic.aspx>.

Falcone et al., "ANUMET—A Novel Wet Gas Flowmeter," SPE 84504, SPE Annual Technical Conference and Exhibition, Oct. 2003: pp. 1-12.

Folgerø et al.,"Permittivity Measurement of Thin Liquid Layers Using Open-Ended Coaxial Probes," Measurement Science and Technology, Aug. 1996, vol. 7(8): pp. 1164-1173.

Fryer et al., "The Effect of Swirl on the Liquid Distribution in Annular Two-phase Flow," International Journal of Multiphase Flow, Jun. 1982, vol. 8(3): pp. 285-289.

"TransPort PT878GC—Portable Gas Ultrasonic Flowmeter," GE Measurement & Control Product Information, Copyright 2012 General Electric Company, Retrieved Feb. 16, 2012, <http://www.ge-mcs.com/en/flow/utlrasonic-clamp-on-gas-/transport-pt878gc.html>.

Gibson et al., "Swirling Flow Through Venturi Tubes of Convergent Angle 10.5° and 21°", ASME 2006 Joint U.S.—European Fluids Summer Meeting, Jul. 2006, vol. 2: Fora: pp. 953-962.

Greenwood et al., "Self-Cailbrating Sensor for Measuring Density Through Stainless Steel Pipeline Wall," Journal of Fluids Engineering, Mar. 2004, vol. 126(2): pp. 89-192.

Gudmundsson et al., "Gas-Liquid Metering Using Pressure-Pulse Technology," SPE 56534, SPE Annual Technical Conference and Exhibition, Oct. 1999. pp. 1-10.

(56) References Cited

OTHER PUBLICATIONS

Gunarathne et al., "Novel Techniques for Monitoring and Enhancing Dissolution of Mineral Deposits in Petroleum Pipelines," SPE 30418, Offshore Europe Conference, Sep. 1995: pp. 507-522.

Hammer, E. A., "Flow Permittivity Models and Their Application in Multiphase Meters," Proceedings of Multiphase Metering, IBC Technical Services, Mar. 1997: pp, 1-10.

Hayman et al., "High-Resolution Cementation and Corrosion imaging by Ultrasound", Society of Petrophysicists & Well Log Analysts 32nd Annual Logging Symposium, Jun. 1991: pp. 1-25.

Lynnworth, L. C., "Level of Liquids and Solids," Ultrasonic Measurements for Process Control; Theory, Techniques, Applications, 1989, Academic Press, Chapter 2, Section 2.4.3: pp. 58-63.

Lynnworth, L. C., "Ultrasonic Measurements for Process Control; Theory, Techniques, Applications," 1989, Academic Press: pp. 23-27, 30, 32-35, 254-255, 312-317.

"V-Cone Flow Meter—The Versatile Solution," Product Information, Copyright 2006-2011 McCrometer, Inc., Retrieved Feb. 20, 2012, <http://www.mccrometer.com/products/product_vcone.asp>.

"DOP2000," Velocimeters Product Information, Signal Processing SA, Retrieved Feb. 6, 2012, <http://www.signal-processing.com/velocimeters.html>.

Solartron ISA: "Dualstream 1 Topside," Oil and Gas Measurement Solutions, Solartron ISA, Hackworth Industrial Park, Shildon, Country Durham DL4 1LH, United Kingdom, http://www.solartronisa.com/Products/dualstreamelite.aspx,> Downloads—Topside Wet Gas Dualstream 1 Brochure, Copyright 2006 Ametek, Inc. [Information printed on Feb. 20, 2012].

Takeda, Y., "Velocity Profile Measurement by Ultrasound Doppler Shift Method," International Journal of Heat and Fluid Flow, Dec. 1986, vol. 7(4): pp. 313-318.

Theron et al., "Stratified Flow Model and Interpretation in Horizontal Wells," SPE 36560, SPE Annual technical Conference and Exhibition, Oct. 1996: pp. 749-757.

Willemetz et al., "Instantaneous Doppler Frequency Measurement and Implementation in a Multgate Flowmeter," EUROSON 87, Jun. 1987: pp. 300.

XIE, C. G., "Measurement of Multiphase Flow Water Fraction and Water-Cut," American Institute of Physics Conference Proceedings, Jun. 2007, vol. 914(1): pp. 232-239.

Yuxing et al., "A New Type of Wet Gas Online Flow Meter Based on Dual Slotted Orifice Plate," 7th International Symposium on Instrumentation and Control Technology: Sensors and Instruments, Computer Simulation, and Artificial Intelligence, 2008, Proceedings of SPIE, vol. 7127: pp. 1-12.

Combined Search and Examination Report of British Application No. GB0704948.9 dated Jul. 9, 2007: pp. 1-5.

International Search Report of PCT Application No. PCT/GB2008/000879 dated Jul. 15, 2008: pp. 1-5.

International Search Report of PCT Application No. PCT/GB2008/003902 dated Feb. 18, 2009: pp. 1-3.

International Search Report of PCT Application No. PCT/GB2008/003139 dated Apr. 24, 2009: pp. 1-6.

International Search Report of PCT Application No. PCT/GB2009/000368 dated Jul. 22, 2009: pp. 1-9.

Office Action of Chinese Application No. 200880008491.7 dated Feb. 15, 2011: pp. 1-11.

Office Action of Chinese Application No. 200880107708.X dated May 18, 2011: pp. 1-12.

Office Action of Chinese Application No. 200880118515.4 dated Sep. 26, 2011: pp. 1-10.

Extended European Search Report of European Application No. 11006610.7 dated Oct. 5, 2011: pp. 1-5.

Combined Search and Examination Report of British Application No. GB0721636.9 dated Feb. 29, 2008: pp. 1-10.

Examination Report of British Application No. GB0721636.9 dated Mar. 24, 2010: pp. 1-8.

International Search Report of PCT Application No. PCT/GB2006/003682 dated Mar. 31, 2009: pp. 1-8.

Official Action of Eurasian Application No. 201070556 dated Jul. 11, 2011: pp. 1-2.

Office Action of Chinese Application No. 200880114364.5 dated Nov. 23, 2011: pp. 1-7.

International Search Report of PCT Application No. PCT/GB2008/003138 dated Jan. 27, 2009: pp. 1-4.

International Search Report of PCT Application No. PCT/G62009/000663 dated Jun. 2, 2009: pp. 1-4.

Office Action of Chinese Application No. 200980108910.9 dated Sep. 23, 2011: pp. 1-11.

Grant Notice of Russian Application No. 2010127231 dated Jan. 28, 2013: pp. 1-7.

* cited by examiner

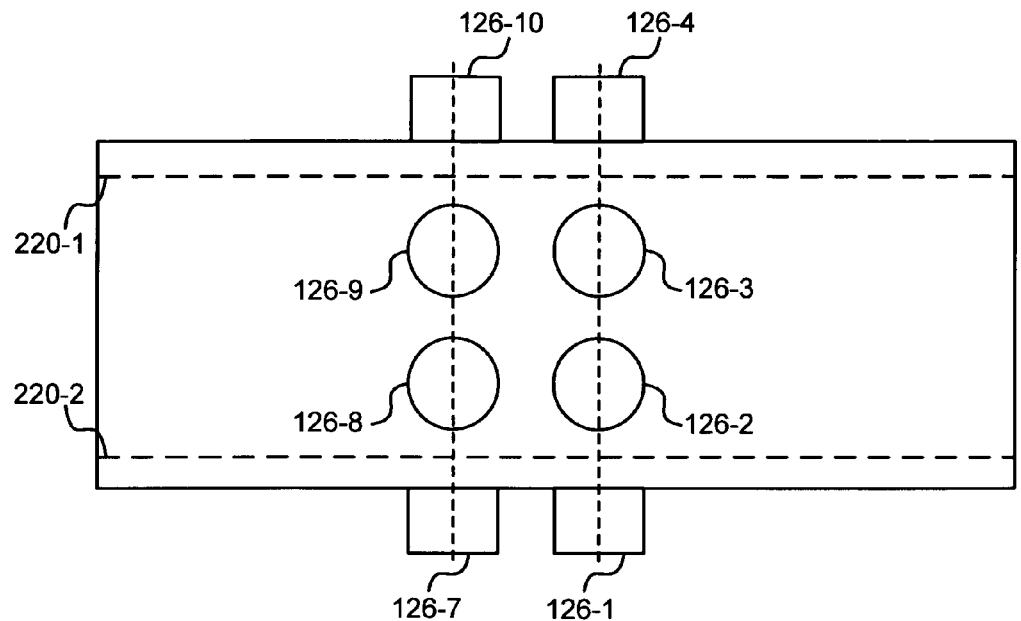
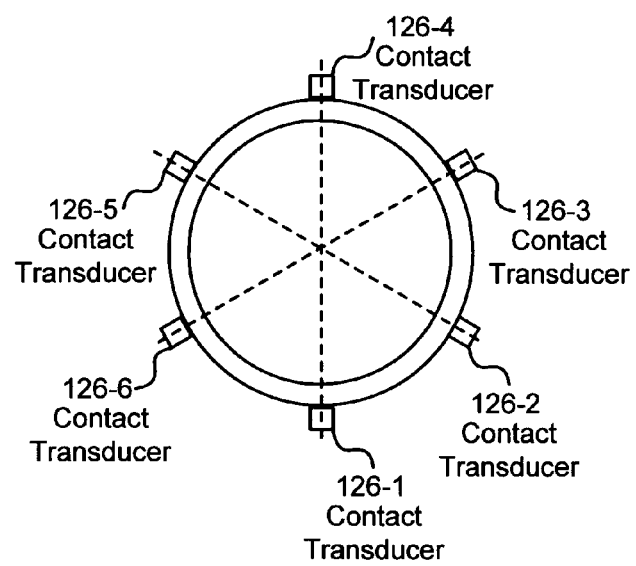
FIG. 2E

ULTRASONIC CLAMP-ON MULTIPHASE FLOWMETER

This application claims the benefit of and is a non-provisional of U.S. Provisional Application Ser. No. 60/992,575 filed on Dec. 5, 2007, which is hereby expressly incorporated by reference in its entirety for all purposes.

BACKGROUND

This disclosure relates in general to flowmeters and, but not by way of limitation, to multiphase flowmeters amongst other things.

Compared to in-line flowmeters, a clamp-on flowmeter offers strong operational and economical advantages. Some of these clamp-on flowmeters are designed to use ultrasound to monitor single-phase flows. However, these flowmeters may not be used to monitor multiphase flows that are common in the oil and gas industry.

For multiphase flows, some ultrasonic techniques are known to be capable of measuring the thickness of a liquid phase in a vessel or pipe. For example, by emitting a pulse signal and measuring an echo from a gas/liquid interface, a round-trip travel time of the pulse signal can be used to determine the gas/liquid interface position. However, a technique such as this requires a speed of sound in the liquid phase to be determined.

In order to determine the speed of sound in the liquid phase, various techniques generally require a length of the pulse signal's travel path to be known. However, in the oil-gas industry where the thickness of the liquid phase can vary from a few millimeters to a few centimeters, it is not practical to design a travel path such that a representative speed of sound can be determined from the travel path.

SUMMARY

One embodiment of the present invention describes a clamp-on flow meter that uses ultrasound to monitor multiphase flows that are common in the oil and gas industry. The clamp-on flow meter determines a speed of sound in the liquid phase without requiring a length of a pulse signal's travel path to be known. In various embodiments, the clamp-on flow meter is capable of determining flow velocity, phase fraction, speed of sound, and acoustic impedance of the liquid phase, which may be combined to determine the flow rate of the liquid phase and the mixing ratios of different components in the liquid phase. Various time-of-flight measurements can be combined to determine the thickness of the liquid layer and speed of sound in the liquid layer.

In one embodiment, the present disclosure provides a multiphase flowmeter for determining at least one characteristic of a first phase flowing in a pipe with at least a second phase being also present in the pipe. The multiphase flowmeter includes a processor configured to determine the at least one characteristic of the first phase. The multiphase flowmeter also includes a first transducer configured to emit a first pulse signal into the first phase at a first incident angle with respect to a straight line that is perpendicular to an interior pipe wall; the first pulse signal is in an ultrasonic range and is configured to be coupled to an exterior pipe wall; and the absolute value of the first incident angle in the first phase is configured to be at least 10 degrees and at most 80 degrees. Additionally, the multiphase flowmeter includes a second transducer configured to emit a second pulse signal into the first phase at a second incident angle with respect to the straight line that is perpendicular to the interior pipe wall; the second pulse signal is in the ultrasonic range and is configured to be coupled to the exterior pipe wall; and the absolute value of the second incident angle in the first phase is configured to be less than 10 degrees, i.e., a substantially normal incidence.

In another embodiment, the present disclosure provides a method for determining a flow rate of a first phase flowing in a pipe with at least a second phase being also present in the pipe. In one step, a first pulse signal is emitted into the first phase at a first incident angle with respect to a straight line that is perpendicular to an interior pipe wall and the first pulse signal being in an ultrasonic range. In another step, a second pulse signal is emitted into the first phase at a second incident angle with respect to the straight line that is perpendicular to the interior pipe wall, the second pulse signal being in the ultrasonic range. In yet another step, the flow rate of the first phase is determined based at least in part on a determination of a mean flow velocity in the first phase.

In yet another embodiment, the present disclosure provides a method for determining a flow rate of a first phase flowing in a pipe with at least a second phase being also present in the pipe. In one step, a first excitation energy is generated at a first general location in a pipe wall at a first incident angle with respect to a straight line that is perpendicular to an interior pipe wall, such that a first pulse signal is emitted into the first phase. In another step, the first pulse signal is received at a second general location where a second excitation energy is generated. In yet another step, the second excitation energy is generated at the second general location in the pipe wall at a second incident angle with respect to the straight line that is perpendicular to the interior pipe wall, such that a second pulse signal is emitted into the first phase. Additionally, in one step, the second pulse signal is received at the first general location where the first excitation energy is generated. In another step, a third excitation energy is generated such that a third pulse signal is emitted at a third general location into the first phase at a third incident angle with respect to the straight line that is perpendicular to the interior pipe wall, the third pulse signal being in an ultrasonic range. In yet another step, the third pulse signal is received at the third general location where the third excitation energy is generated.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 2A through 2I depict functional diagrams of embodiments of the flowmeter, in accordance with aspects of the present invention;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
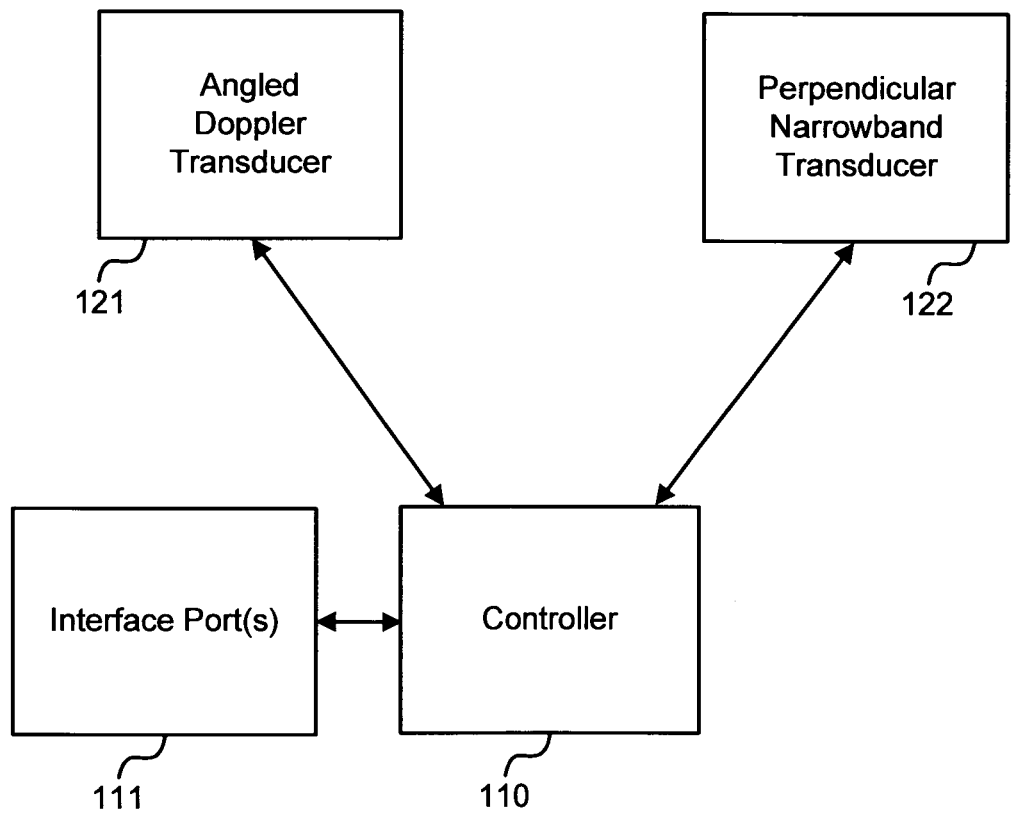
FIGS. 1A through 1I depict block diagrams of embodiments of a flowmeter, in accordance with aspects of the present invention.

Referring first to FIG. 1A, an embodiment of a dual-transducer flowmeter 101 is shown. An angled Doppler transducer 121 and a perpendicular narrowband transducer 122 connect to a controller 110 for determining at least one characteristic of a liquid phase in a pipe. The controller 110 connects to interface port(s) 111 from which the controller 110 accepts input and produces output for the at least one characteristic of the liquid phase.

The angled Doppler transducer 121 is a narrowband transducer that is usable for a range-gated Doppler measurement. The details of the narrowband transducer design for a range-gated Doppler measurement of flow velocity have been described, for example, in U.S. Pat. No. 6,758,100, entitled "DOPPLER FLOWMETER FOR MULTIPHASE FLOWS," the entire disclosure of which is incorporated herein by reference for all purposes. As will be described in greater detail, the angled Doppler transducer 121 produces a flow velocity profile and a Doppler echo energy profile. From the profiles, at least a time-of-flight determination can be determined.

The perpendicular narrowband transducer 122 has a normal incident angle with respect to a center line of the pipe. The perpendicular narrowband transducer 122 can be used for a range-gated Doppler measurement to determine at least a second time-of-flight determination. The perpendicular narrowband transducer 122 can also perform a time-domain pulse-echo measurement to determine a time-of-flight in a pipe wall and from a gas-liquid interface.

The controller 110 may comprise a processing unit, memory, input and output ports, pulser-receiver and amplification circuitry, and clock circuitry. The controller 110 may also comprise an analog to digital converter and a signal processor for converting analog signals and performing a frequency domain analysis. The controller 110 controls the angled Doppler transducer 121 and the perpendicular narrowband transducer 122 in order to perform various measurements and to determine the at least one characteristic of the liquid phase.

The interface port(s) 111 may connect to a display for output of a determination determined by the controller 110. The interface port(s) 111 may also connect either wired or wirelessly, through a communication interface or a network, to a system remote from the flowmeter to enable remote monitoring of the determination determined by the controller 110. Additionally, the interface port(s) 111 may accept input from button presses or keyboard entries to control operations of the controller. The interface port(s) 111 may also accept input either wired or wirelessly, through a communication interface or a network, from a system remote from the flowmeter to enable remote control of operations of the controller 110.

Figure 1B:
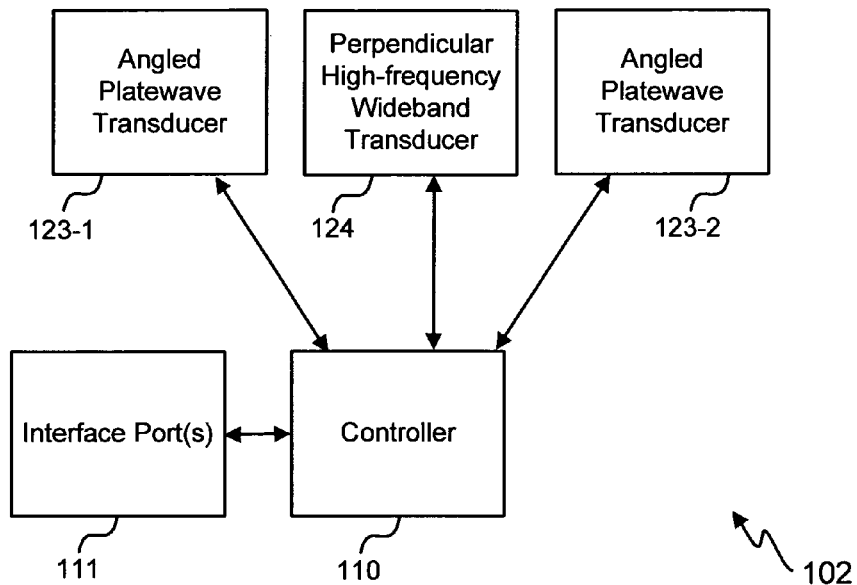

With reference to FIG. 1B, an embodiment of a triple-transducer platewave flowmeter 102 is shown. The triple-transducer platewave flowmeter 102 is similar to the dual-transducer flowmeter 101 in FIG. 1A as they both use at least an angled and a perpendicular transducer. The triple-transducer platewave flowmeter 102 includes two angled platewave transducers 123 and a perpendicular high-frequency wideband transducer 124.

The platewave transducers 123 generate useful excitation pulses having a typical frequency range from 50 kHz to 1 MHz. The transducers are arranged facing toward each other to form a transmitter and receiver pair; the spacing between them is typically a few hundred millimeters and is adjustable. During a typical operation, the first platewave transducer 123-1 generates an excitation pulse that produces a platewave in the pipe wall. As the platewave travels along the pipe wall, ultrasound energy is emitted into the liquid phase. The second platewave transducer 123-2 then receives reflected ultrasound energy as well as the platewave. Subsequently, the second platewave transducer 123-2 generates an excitation pulse and the first platewave transducer 123-1 operates as a receiver. Two time-of-flight determinations, one determined when the platewave travels in the same direction as the flow of the liquid phase and one determined when the platewave travels in the opposite direction, can be determined in this embodiment.

The perpendicular high-frequency wideband transducer 124 generates useful pulses having a typical frequency range from 1 MHz to 20 MHz. As will be explained in greater detail, the perpendicular high-frequency wideband transducer 124 performs a time-domain pulse-echo measurement to determine a time-of-flight in the pipe wall and from the gas-liquid interface.

Figure 1C:
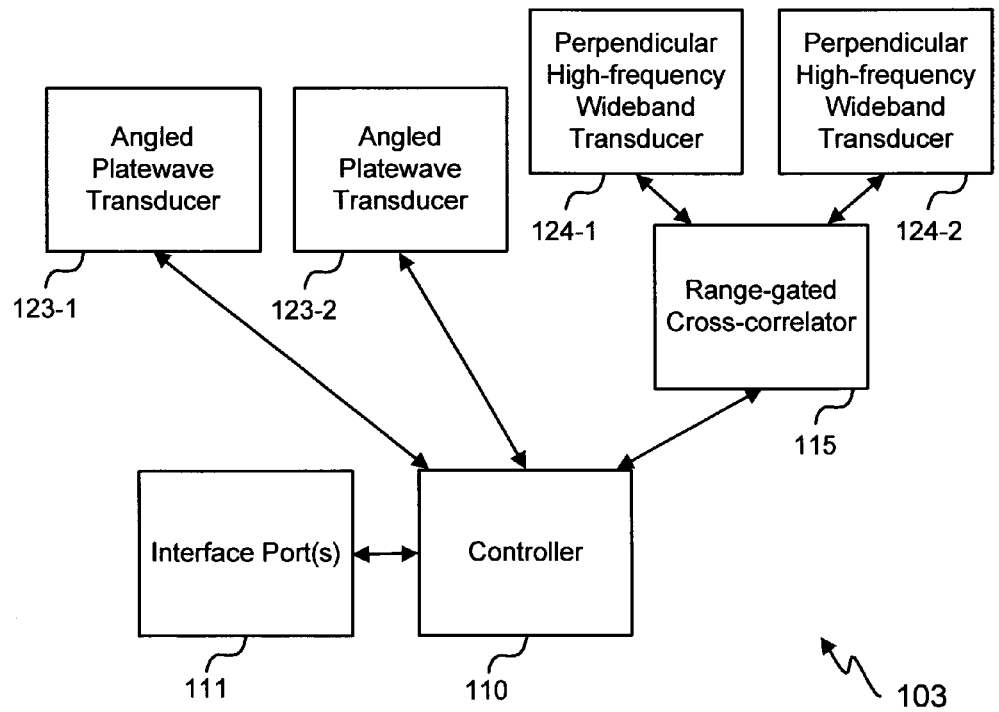

Referring next to FIG. 1C, an embodiment of a cross-correlation/platewave flowmeter 103 is shown. The cross-correlation/platewave flowmeter 103 is similar to the triple-transducer platewave flowmeter 102 in FIG. 1B, except the cross-correlation/platewave flowmeter 103 uses perpendicular high-frequency transducers 124 and a range-gated cross-correlator 115. This embodiment demonstrates one way to produce a velocity profile of the liquid phase.

The perpendicular high-frequency transducers 124 each emits energy into the liquid phase and receives energy back. The energy may be reflected back by echo-producing reflectors that are present at different depth levels in the liquid phase. The range-gated cross-correlator 115 enables energies reflected from different depth levels to be selected, and by cross-correlating between the energies received by the two transducers, a velocity profile of the liquid phase can be produced in this embodiment.

Figure 1D:
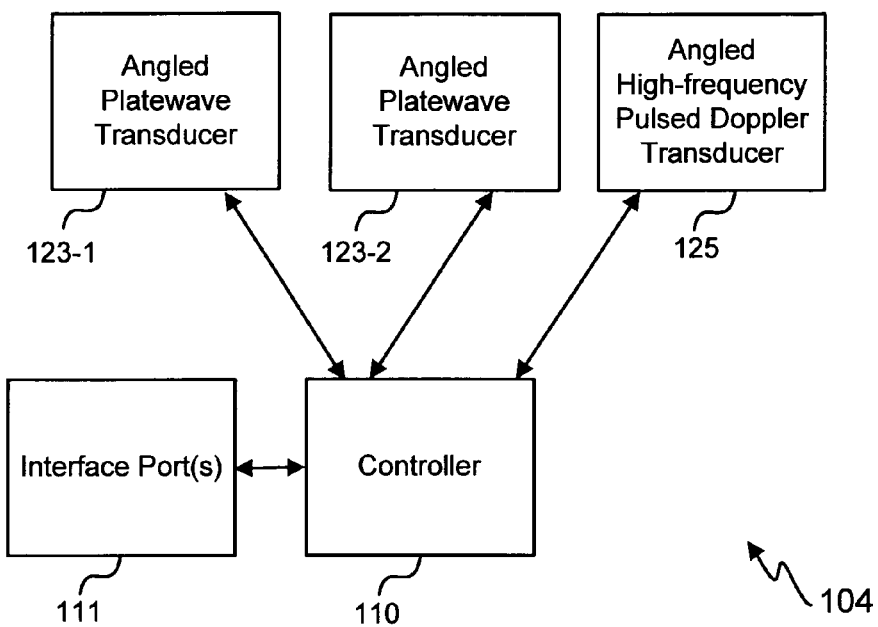

With reference to FIG. 1D, an embodiment of a Doppler/platewave flowmeter 104 is shown. The Doppler/platewave flowmeter 104 is similar to the triple-transducer platewave flowmeter 102 in FIG. 1B, except the Doppler/platewave flowmeter 104 uses an angled high-frequency pulsed Doppler transducer 125 to produce a velocity profile. The angled high-frequency pulsed Doppler transducer 125 operates in a manner similar to the aforementioned angled Doppler transducer 121. Compared to the cross-correlation/platewave flowmeter 103, the Doppler/platewave flowmeter 104 enables a velocity profile to be produced with fewer transducers.

Figure 1E:
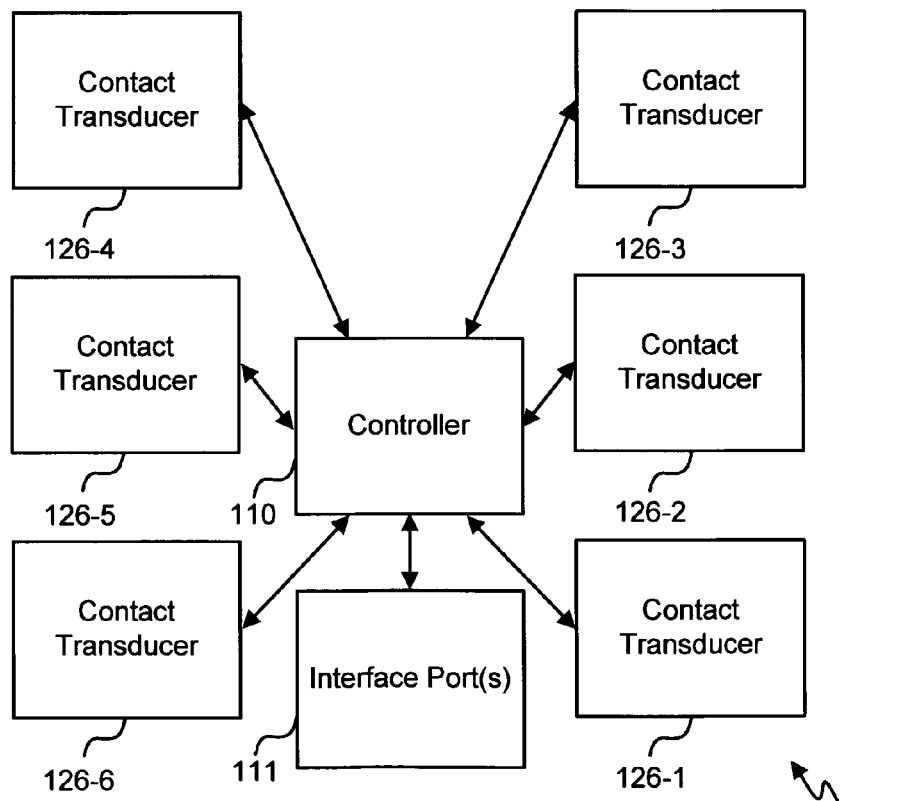

Referring next to FIG. 1E, an embodiment of a contact-transducer flowmeter 105 is shown. The contact-transducer flowmeter 105 is similar to the triple-transducer platewave flowmeter 102 in FIG. 1B, except the contact-transducer flowmeter 105 uses various types of contact transducers 126. In one embodiment, the contact-transducer flowmeter 105 may enable the fluid type behind the pipe wall to be detected with acoustic impedance measurements. In another embodiment, the contact-transducer flowmeter 105 may provide velocity measurements along multiple paths in the pipe for a more accurate average velocity measurement.

The contact transducers 126 are in direct contact with the pipe. The contact surface may be flat or curved in order to match the exterior of the pipe. At the contact surface, contact materials may be used to remove any air gap between the transducer and the pipe. Techniques used for the contact transducers 126 may include delay line, dual-element, etc. A delay line transducer allows sending of an ultrasonic signal to be completed before receiving an ultrasonic signal. A dual-element transducer generally has one independent element that sends an ultrasonic signal and the other independent element that receives an ultrasonic signal. The contact transducers 126 may be arranged at different angles around the circumference of the pipe. Some of the contact transducers 126 may detect the fluid type behind the pipe wall by using acoustic impedance measurements. Other contact transducers 126 may provide velocity measurements along multiple paths in the pipe for a more accurate average velocity measurement.

Figure 1F:
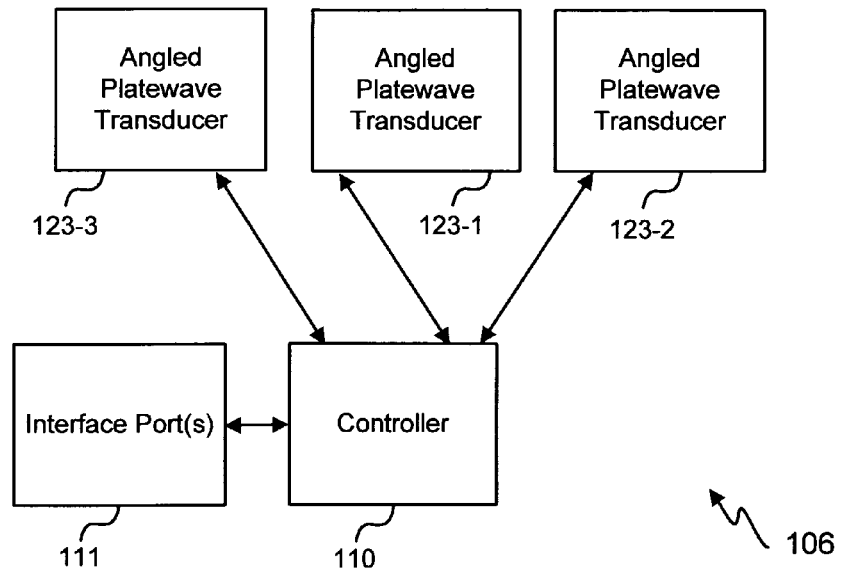

With reference to FIG. 1F, an embodiment of a multi-spacing platewave flowmeter 106 is shown. The multi-spacing platewave flowmeter 106 is similar to the triple-transducer platewave flowmeter 102 in FIG. 1B, except the multi-spacing platewave flowmeter 106 uses a third angled platewave transducer 123-3. The third angled platewave transducer 123-3 provides an additional measurement with a longer spacing between the third angled platewave transducer 123-3 and the second angled platewave transducer 123-2. While a shorter spacing provides better signal to noise ratio for detecting the primary echoes, the longer spacing enables more multiples of fluid interface echoes to be detected.

Figure 1G:
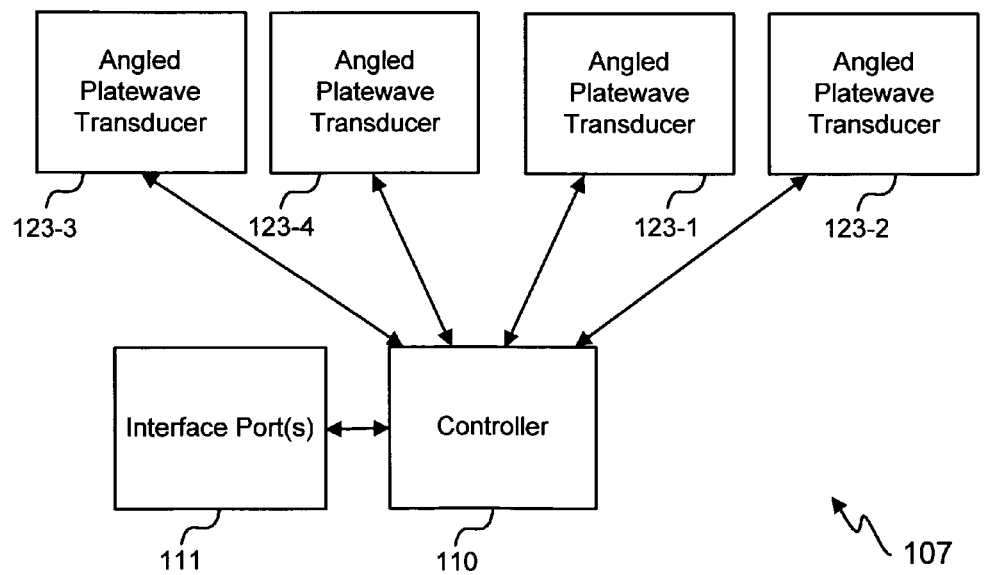

Referring next to FIG. 1G, an embodiment of a top-bottom platewave flowmeter 107 is shown. The top-bottom platewave flowmeter 107 is similar to the triple-transducer platewave flowmeter 102 in FIG. 1B, except the top-bottom platewave flowmeter 107 uses additional angled platewave transducers 123. The additional angled platewave transducers 123 may form transmitter and receiver pairs among them for additional measurements.

Figure 1H:
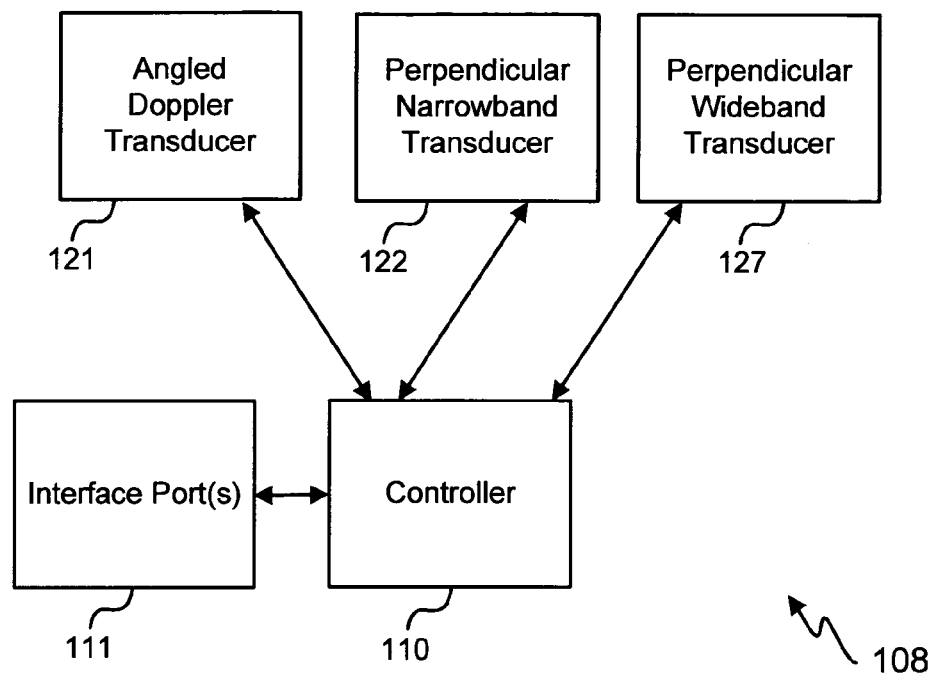

With reference to FIG. 1H, an embodiment of a wideband flowmeter 108 is shown. The wideband flowmeter 108 is similar to the dual-transducer flowmeter 101 in FIG. 1A, except the wideband flowmeter 108 uses a perpendicular wideband transducer 127 in addition to or in place of a perpendicular narrowband transducer 122. This embodiment may enable an alternative method of measurement or provide a redundancy of measurements.

The wideband transducer 127 generates useful pulses having a typical frequency range from 1 MHz to 20 MHz. As will be described in greater detail, the wideband transducer 127 can be used to determine the acoustic impedance of the liquid phase and the fraction of water in the liquid phase. Subsequently, in one embodiment, the speed of sound and thickness of a stratified/separated liquid phase can be determined. In another embodiment, the speed of sound and thickness of an annular liquid phase can also be determined.

Figure 1I:
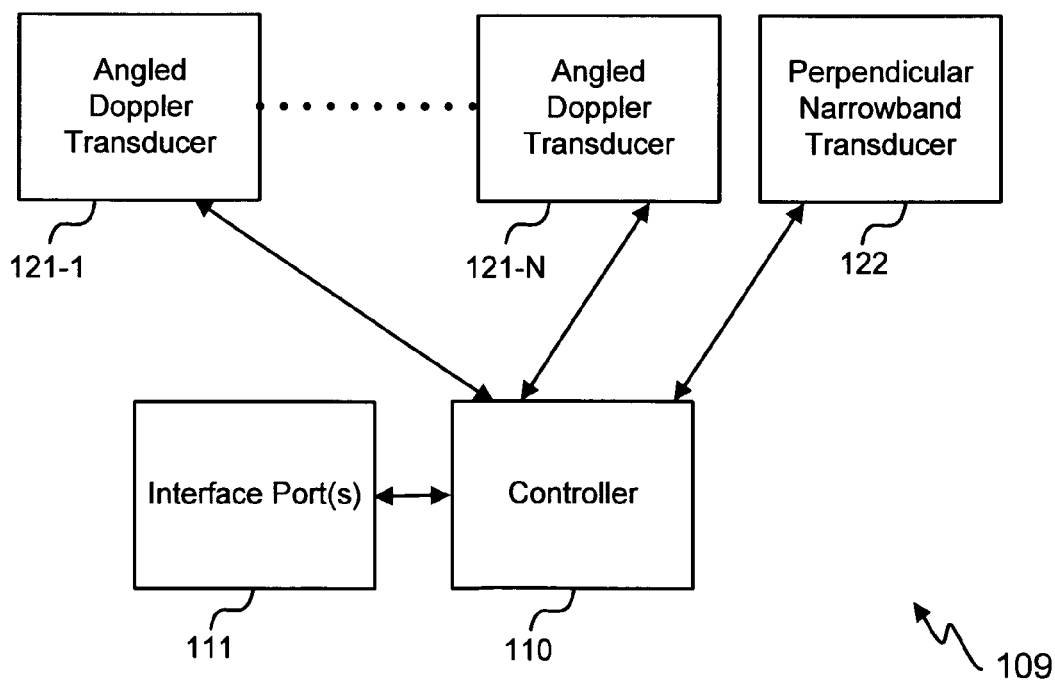

Referring next to FIG. 1I, an embodiment of a multi-angled flowmeter 109 is shown. The multi-angled flowmeter 109 is similar to the dual-transducer flowmeter 101 in FIG. 1A, except the multi-angled flowmeter 109 uses additional angled Doppler transducers 121. The additional angled Doppler transducers 121 may operate at different angles and/or different frequencies from each other to enable more robust velocity profile determinations in one embodiment.

Figure 2A:
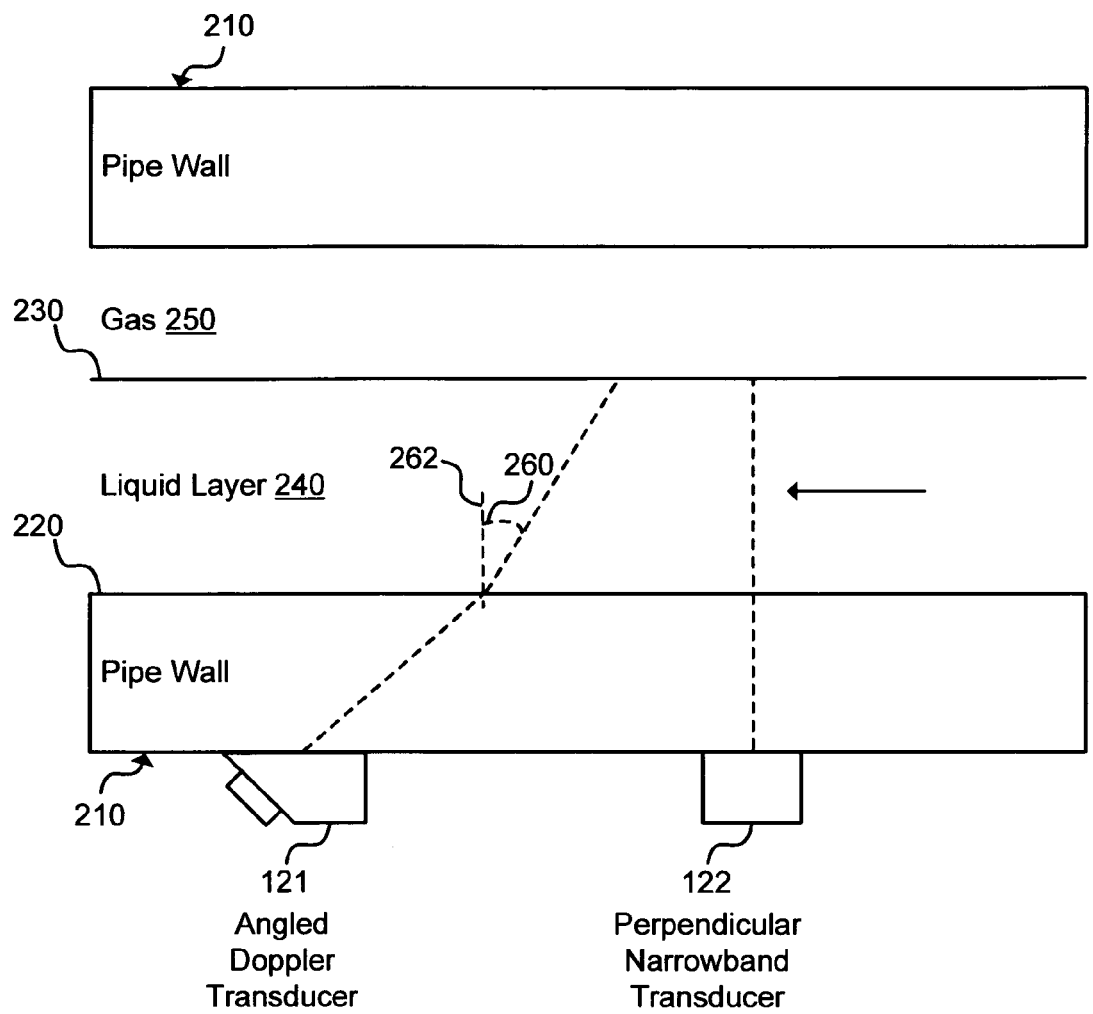

With reference to FIG. 2A, an embodiment of the dual-transducer flowmeter 101 in FIG. 1A being functionally coupled to a pipe wall 210 is shown. The coupling may be of a removable type such as a clamp-on. As will be appreciated by those of skill in the art, the coupling may also be of a permanent type such as by building a transducer housing directly into a section of a pipe. Additional ways to affix the dual-transducer flowmeter 101 to the pipe may include using epoxy, tie-wrapping around the pipe, etc. The multiphase flow in the pipe comprises of at least a liquid layer 240 and gas 250. A pipe/liquid interface 220 exists between the pipe wall 210 and the liquid layer 240. Additionally, a gas/liquid interface 230 exists between the liquid layer 240 and gas 250.

The angled Doppler transducer 121 is configured to emit a pulse signal into the liquid layer 240 at an incident angle 260 with respect to a straight line 262 that is perpendicular to the interior pipe wall at the pipe/liquid interface 220. It will be understood that the pipe wall at the pipe/liquid interface 220 may not be cylindrically shaped and may not have a uniform surface as the surface may have imperfections. However, the interior pipe wall at the pipe/liquid interface 220 is generally cylindrical and has a uniform surface. One can define the incident angle 260 as positive if the axial propagation direction of the pulse is against the direction of the flow, and negative if it is with the direction of the flow. The absolute value of the incident angle 260 in the liquid layer 240 is generally at least 10 degrees and at most 80 degrees. It will be appreciated by those skilled in the art that other absolute values for the incident angle 260 in the liquid layer 240 may be used in various embodiments, such as at least 45 degrees and at most 70 degrees, at least 37 degrees and at most 58 degrees, and at least 18 degrees and at most 80 degrees.

The angled Doppler transducer 121 can be used to determine a first time-of-flight from the time of the emission of the pulse signal to the arrival of a return echo as reflected from the gas/liquid interface 230. As will be appreciated by those of skill in the art, the emission of the pulse signal travels against the flow of the liquid layer 240 and the return echo travels with the flow. Additionally, a round trip time-of-flight of the pulse signal in the pipe wall 210 can be determined such as with a calibration measurement.

The perpendicular narrowband transducer 122 is also configured to emit a pulse signal into the liquid layer 240 at an incident angle 260 with respect to the straight line 262 that is perpendicular to the interior pipewall at the pipe/liquid interface 220. The absolute value of the incident angle 260 in the liquid layer 240 is generally less than 10 degrees deviated from 0 degrees. It will be appreciated by those skilled in the art that other incident angles 260 in the liquid layer 240 may be used in various embodiments, such as within ±5 degrees, within ±1.5 degrees, and at least −0.5 degree and at most +0.5 degree.

Similar to the angled Doppler transducer 121, the perpendicular narrowband transducer 122 can be used to determine at least a second time-of-flight determination. The effect of flow velocity on the second time-of-flight determination is absent or is different from the first determination determined with the angled Doppler transducer 121. It will be appreciated by those of skill in the art that the two time-of-flight determinations, with the corresponding time-of-flight in the pipe wall removed, can form the following two equations, where c is the speed of sound in the liquid layer 240, h is the thickness of the liquid layer 240, and k is a known constant based on the speed of sound and the refraction angle in the pipe wall 210:

$$\text{First time-of-flight determination} = \frac{2 \cdot h}{c \cdot \sqrt{1 - (k \cdot c)^2}}, \text{ and}$$

$$\text{Second time-of-flight determination} = \frac{2 \cdot h}{c}.$$

By combining the time-of-flight determinations from both the angled Doppler transducer 121 and the perpendicular narrowband transducer 122, the speed of sound in the liquid layer 240 can be determined in this embodiment. From the speed of sound determination, the thickness of the liquid layer 240 can also be determined. Additionally, the speed of sound in the liquid layer 240 can be used to determine the fraction of water in the liquid layer 240. Moreover, the flow rate of the liquid layer 240 can be determined based on a mean flow velocity and the thickness of the liquid layer 240. In some embodiments, the mean flow velocity may be determined based on a determination of a velocity profile of the liquid layer 240. In some aspects of the present invention, the velocity profile may be measured by the angled (pulsed) Doppler transducer 121.

Figure 2B:
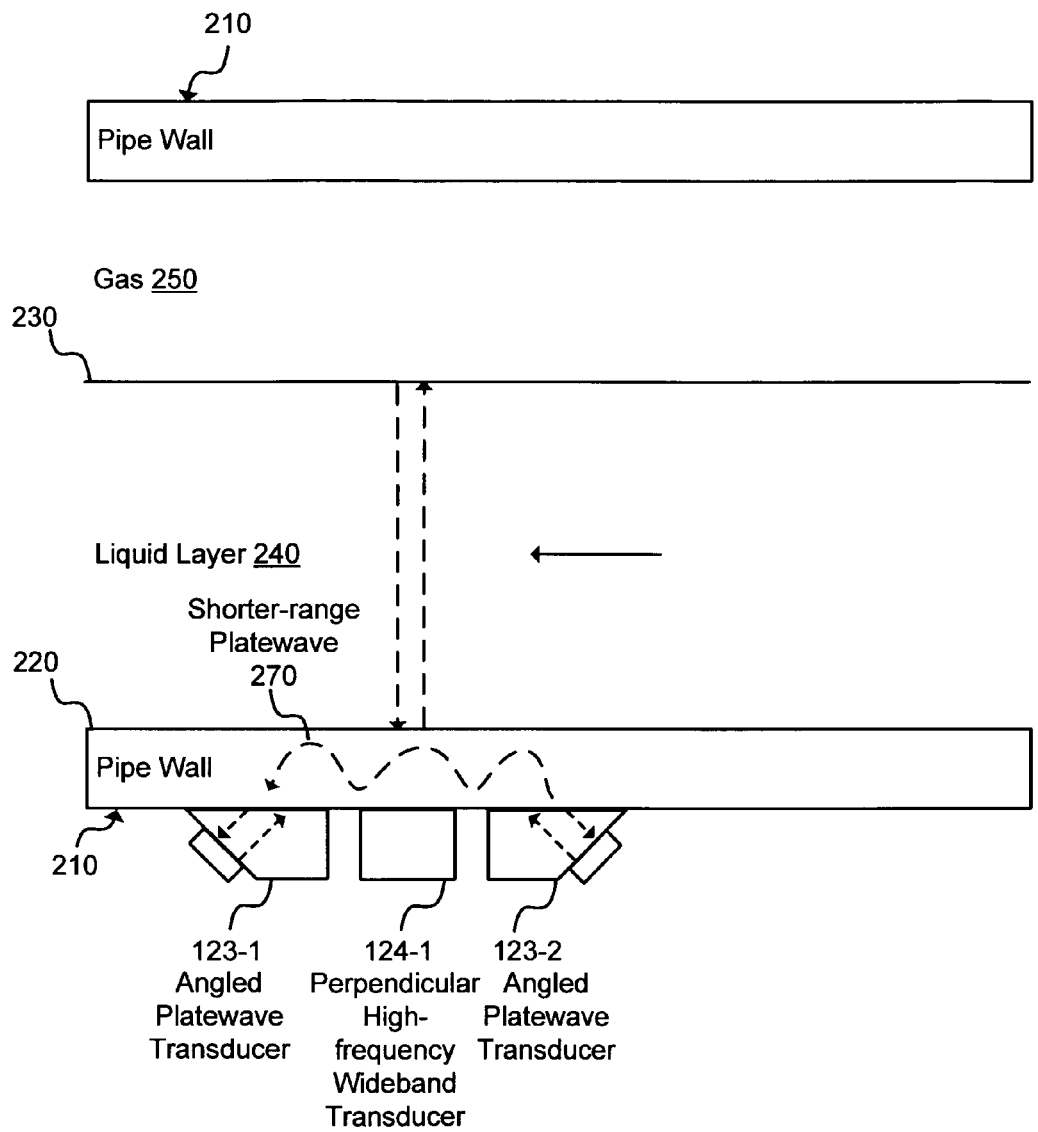

Referring next to FIG. 2B, an embodiment of the triple-transducer platewave flowmeter 102 in FIG. 1B being functionally coupled to the pipe wall 210 is shown. This embodiment is similar to the embodiment depicted in FIG. 2A as they both use at least an angled and a perpendicular transducer.

Two angled platewave transducers 123 can be used to produce and detect a shorter-range platewave 270. A second angled platewave transducer 123-2 produces the shorter-range platewave 270 that travels in the same direction as the flow of the liquid layer 240, with a first angled platewave transducer 123-1 operating as a receiver. Subsequently, the first angled platewave transducer 123-1 produces a platewave that travels in the opposite direction as the flow of the liquid layer 240, with the second angled platewave transducer 123-2 operating as a receiver. A perpendicular high-frequency wideband transducer 124 performs a time-domain pulse-echo-measurement to determine a time-of-flight determination of the gas-liquid interface 230 as well as a time-of-flight determination in the pipe wall 210.

The angled platewave transducers 123 can be used to determine a first time-of-flight determination and a third time-of-flight determination, one with the flow and one against the flow. As will be explained in greater detail, the perpendicular high-frequency wideband transducer 124 that is substantially perpendicular to the interior pipe wall at the pipe/liquid interface 220 can be used to determine a second time-of-flight determination that is absent from the effect of flow velocity. It will be appreciated by those skilled in the art that the three in-liquid time-of-flight determinations can be used in the following three equations:

Difference between first and third time-of-flight determinations =

$$4 \frac{h}{c} \frac{k}{\sqrt{1 - (k \cdot c)^2}} V,$$

$$\text{Sum of first and third time-of-flight determinations} = 4 \frac{h}{c} \frac{(1 - k \cdot c^2 / p)}{\sqrt{1 - (k \cdot c)^2}},$$

and $$\text{Second time-of-flight determination} = \frac{2 \cdot h}{c},$$

where c is the speed of sound in the liquid layer 240, h is the thickness of the liquid layer 240, V is the mean flow velocity of the liquid layer 240, p is a known platewave velocity in the pipe wall 210, and k is a known constant based on the speed of sound and the refraction angle in the pipe wall 210. From the three time-of-flight determinations, the speed of sound, thickness, and mean flow velocity of the liquid layer 240 can be determined in this embodiment.

Figure 2C:
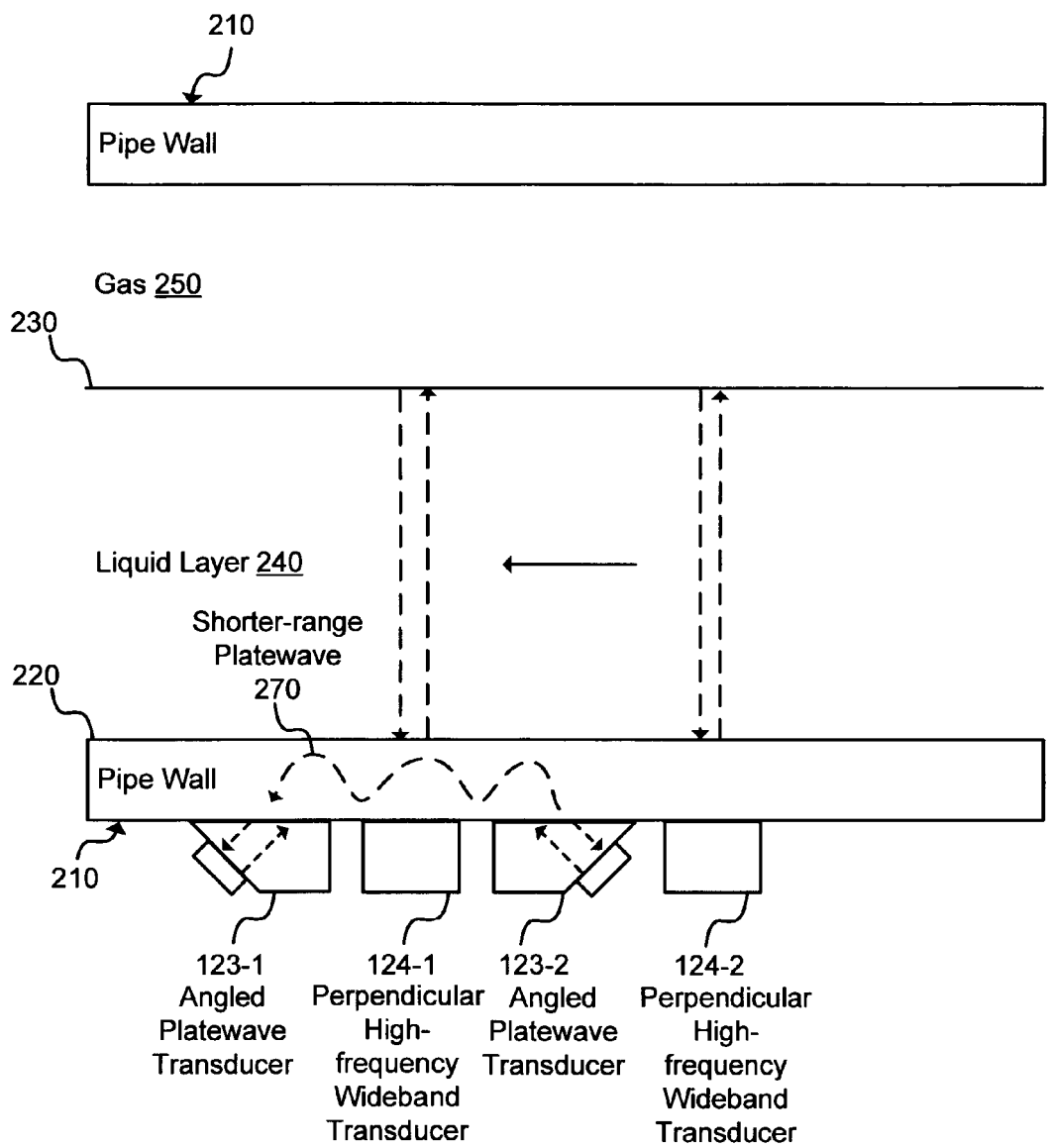

With reference to FIG. 2C, an embodiment of the cross-correlation/platewave flowmeter 103 in FIG. 1C being functionally coupled to the pipe wall 210 is shown. This embodiment is similar to the embodiment depicted in FIG. 2B, except high-frequency transducers 124 can be used to produce a velocity profile by cross-correlating, in a range-gating manner, the echo energies received by the two transducers. This embodiment demonstrates one way to produce a velocity profile of the liquid layer 240.

Figure 2D:
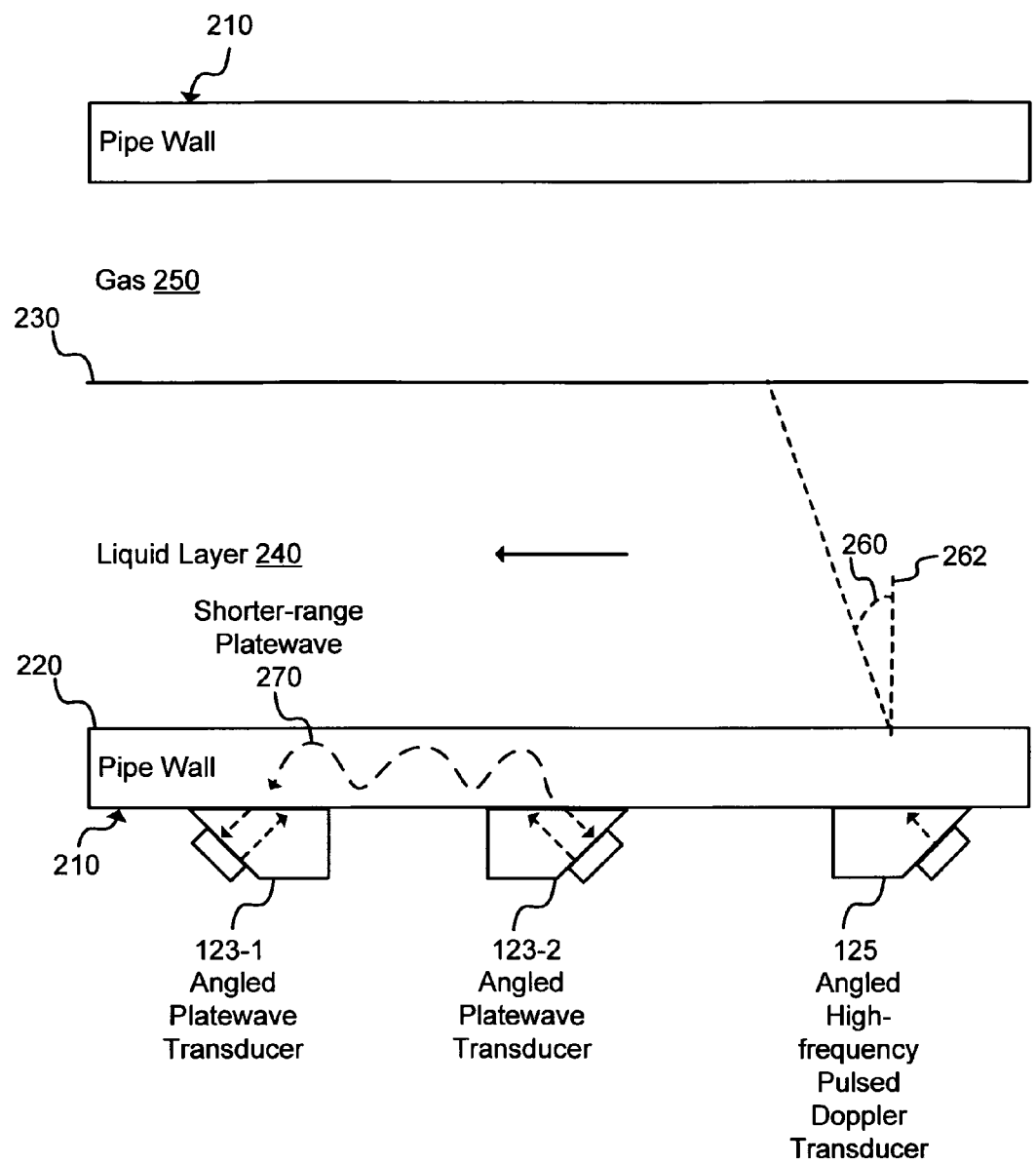

Referring next to FIG. 2D, an embodiment of the Doppler/platewave flowmeter 104 in FIG. 1D being functionally coupled to the pipe wall 210 is shown. This embodiment is similar to the embodiment depicted in FIG. 2B, except an angled high-frequency pulsed Doppler transducer 125 can be used to produce a velocity profile. This embodiment demonstrates another way to produce a velocity profile of the liquid layer 240 with fewer transducers.

The angled high-frequency pulsed Doppler transducer 125 is configured to emit a pulse signal into the liquid layer 240 at an incident angle 260 with respect to the straight line that is perpendicular to the interior pipewall at the pipe/liquid interface 220. The absolute value of the incident angle 260 in the liquid layer 240 is generally at least 10 degrees and at most 80 degrees. It will be appreciated by those of skill in the art that other absolute values for the incident angle 260 in the liquid layer 240 may be used in various embodiments, such as at least 45 degrees and at most 70 degrees, at least 27 degrees and at most 58 degrees, and at least 58 degrees and at most 80 degrees.

With reference to FIG. 2E, an embodiment of the contact-transducer flowmeter 105 in FIG. 1E being functionally coupled to the pipe wall 210 is shown. This embodiment is similar to the embodiment depicted in FIG. 2B, except various types of contact transducers 126 are used. In one embodiment, the fluid type behind the pipe wall may be detected with acoustic impedance measurements. In another embodiment, a more accurate average velocity measurement may be provided with velocity measurements along multiple paths in the pipe.

The contact transducers 126 may be arranged at different angles around the circumference of the pipe. A contact transducer 126-4 on the top of the pipe may form a transmitter and receiver pair with a contact transducer 126-1 on the bottom of the pipe. Likewise, a contact transducer 126-2 on one side of the pipe may form an additional transmitter and receiver pair with a contact transducer 126-5 on the opposite side of the pipe. Similarly, contact transducers 126-10, 126-4 on the top of the pipe may also form transmitter and receiver pairs with contact transducers 126-7, 126-1 on the bottom of the pipe. There may be intervals when the liquid layer 240 fills up the pipe, enabling direct transmission between the transmitter and receiver pairs.

Figure 2F:
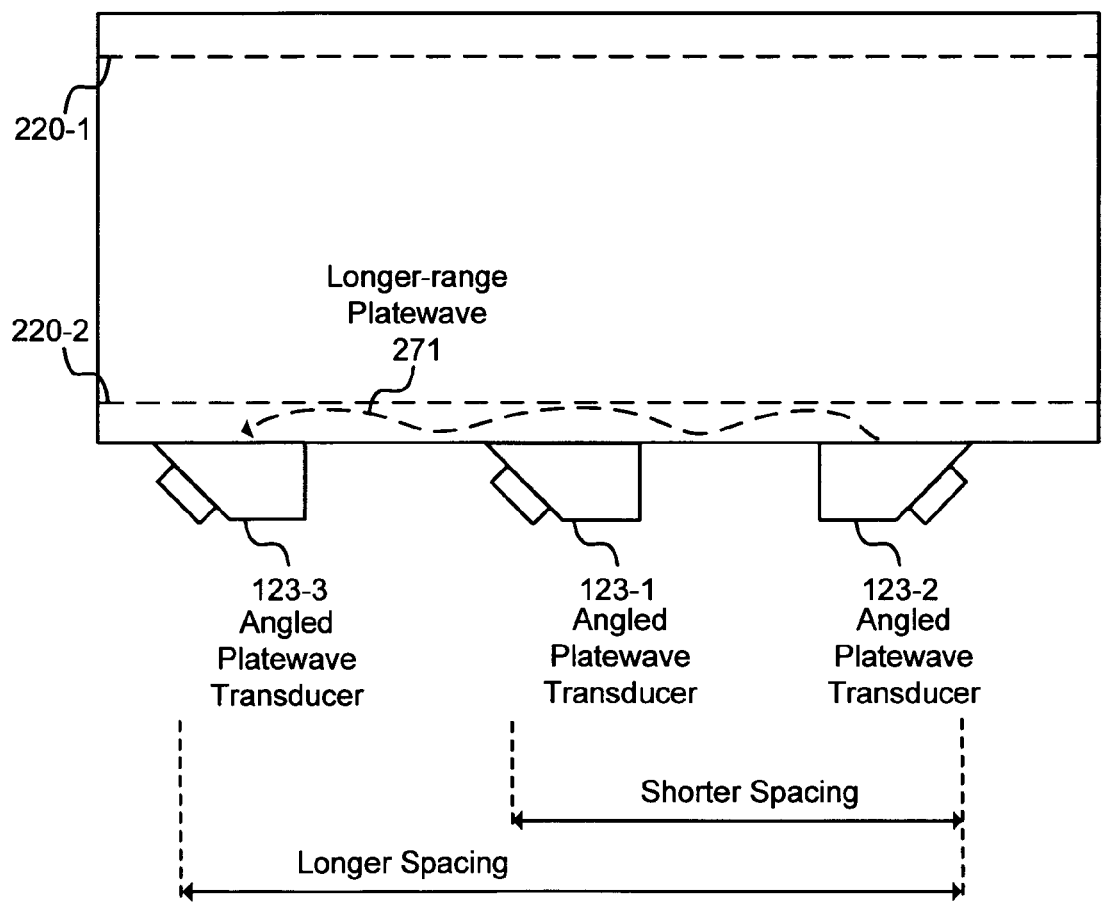

Referring next to FIG. 2F, an embodiment of the multi-spacing platewave flowmeter 106 in FIG. 1F being functionally coupled to the pipe wall 210 is shown. This embodiment is similar to the embodiment depicted in FIG. 2B, except this embodiment uses a third angled platewave transducer 123-3. The third angled platewave transducer 123-3 enables a longer-range platewave 271 to be produced and received. The longer-range platewave 271 may allow more information about the flow to be determined in this embodiment.

Figure 2G:
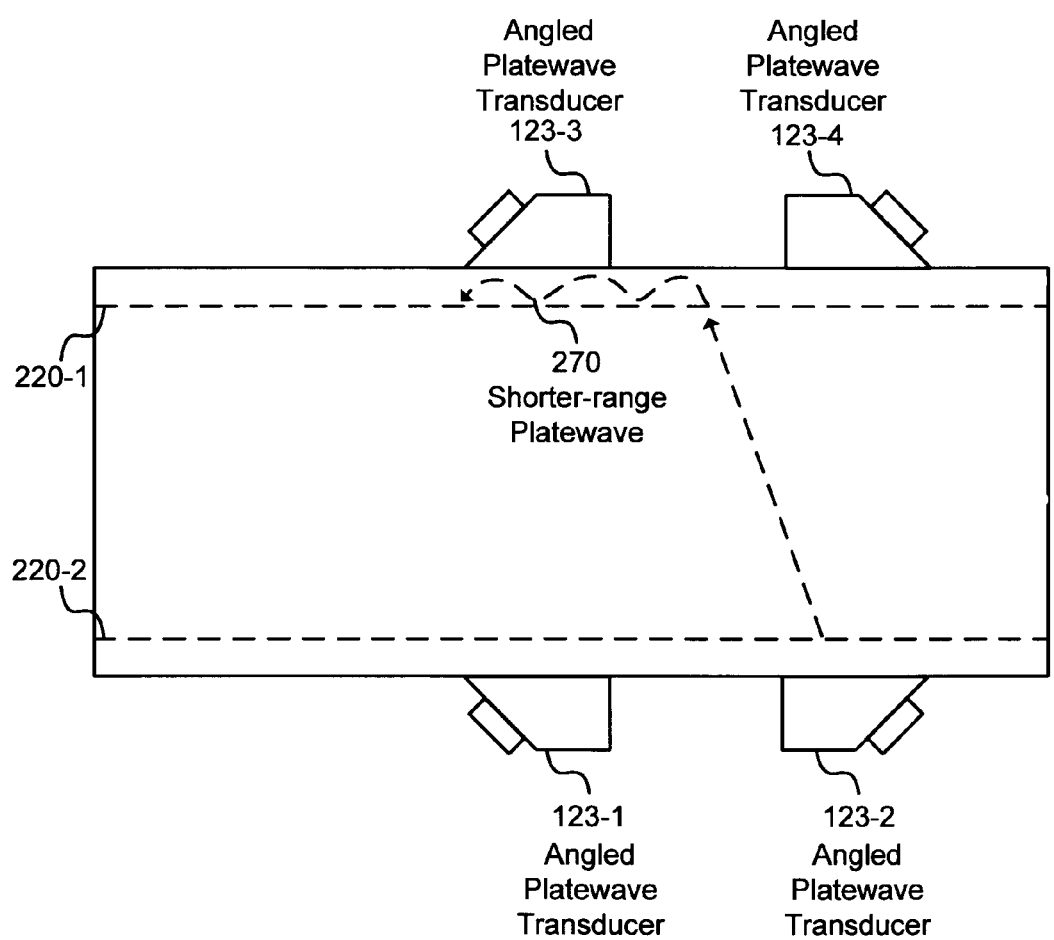

With reference to FIG. 2G, an embodiment of the top-bottom platewave flowmeter 107 in FIG. 1G being functionally coupled to the pipe wall 210 is shown. This embodiment is similar to the embodiment depicted in FIG. 2B, except additional angled platewave transducers 123 are used in this embodiment. Angled platewave transducers 123-3, 123-4 on the top of the pipe may form additional transmitter and receiver pairs with angled platewave transducers 123-2, 123-1 on the bottom of the pipe.

Figure 2H:
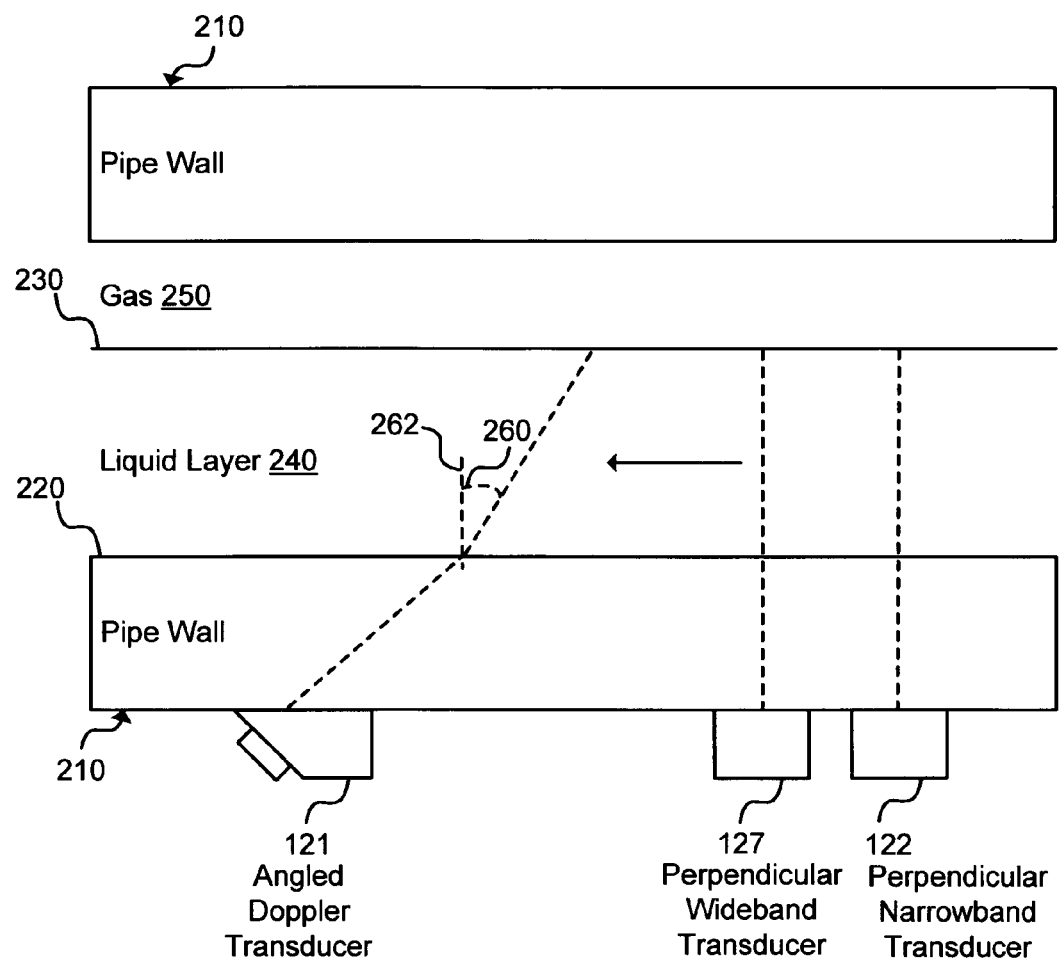
Figure 21:
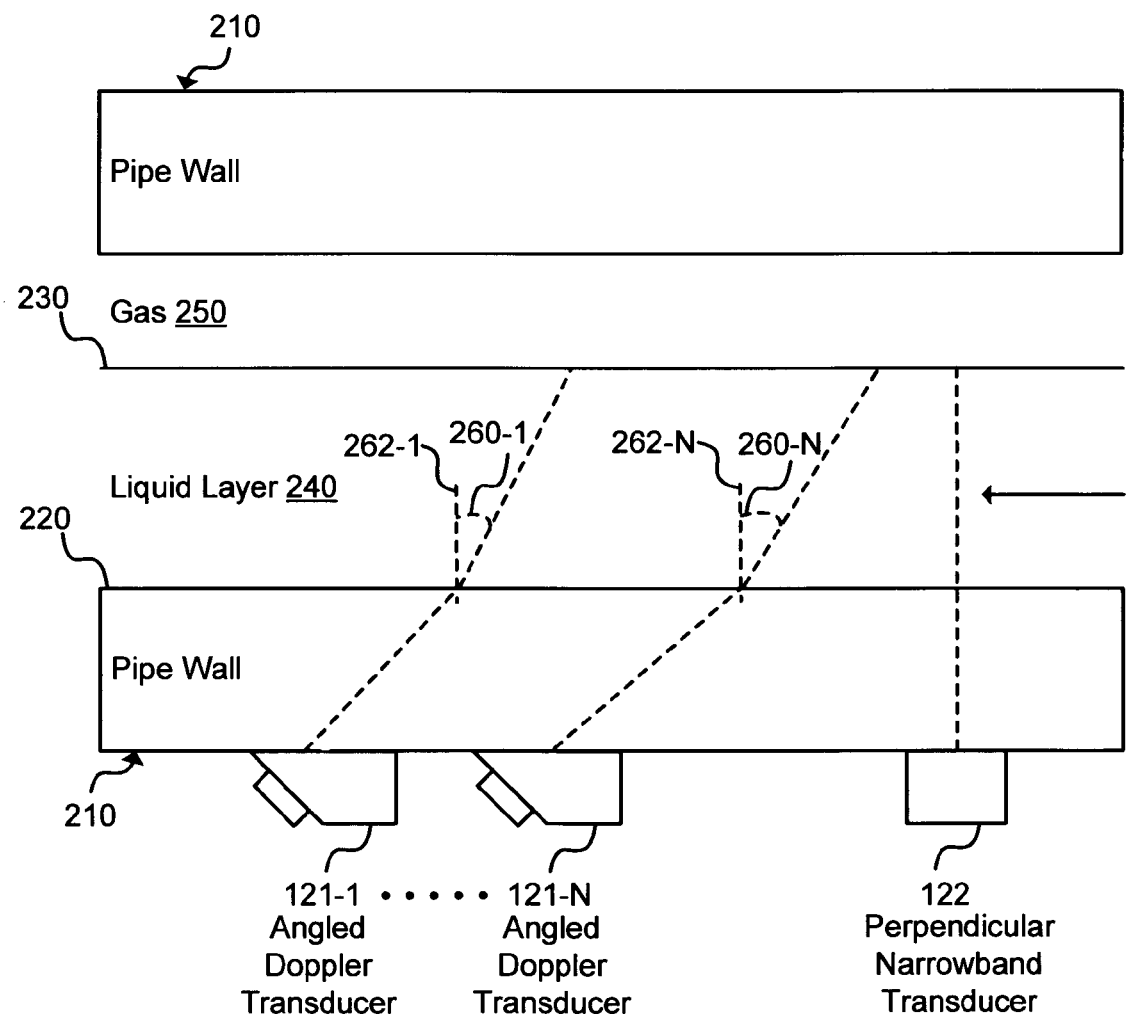

Referring next to FIG. 2H, an embodiment of the wideband flowmeter 108 in FIG. 1H being functionally coupled to the pipe wall 210 is shown. This embodiment is similar to the embodiment depicted in FIG. 2A, except this embodiment uses a perpendicular wideband transducer 127 in addition to or in place of a perpendicular narrowband transducer 122. This embodiment may enable an alternative method of measurement or provide a redundancy of measurements.

With reference to FIG. 2I, an embodiment of the multi-angled flowmeter 109 in FIG. 1I being functionally coupled to the pipe wall 210 is shown. This embodiment is similar to the embodiment depicted in FIG. 2A, except additional angled Doppler transducers 121 operating at different angles and/or different frequencies from each other are used in this embodiment. This embodiment may enable more robust velocity profile determinations. A perpendicular angled Doppler transducer 121 (with an incident angle 260 at substantially zero degree) may provide an alternative (to the narrowband transducer 122) determination of the pipe/liquid interface 220 and/or the gas/liquid interface 230, based on the measured Doppler echo energy profile.

Figure 3A:
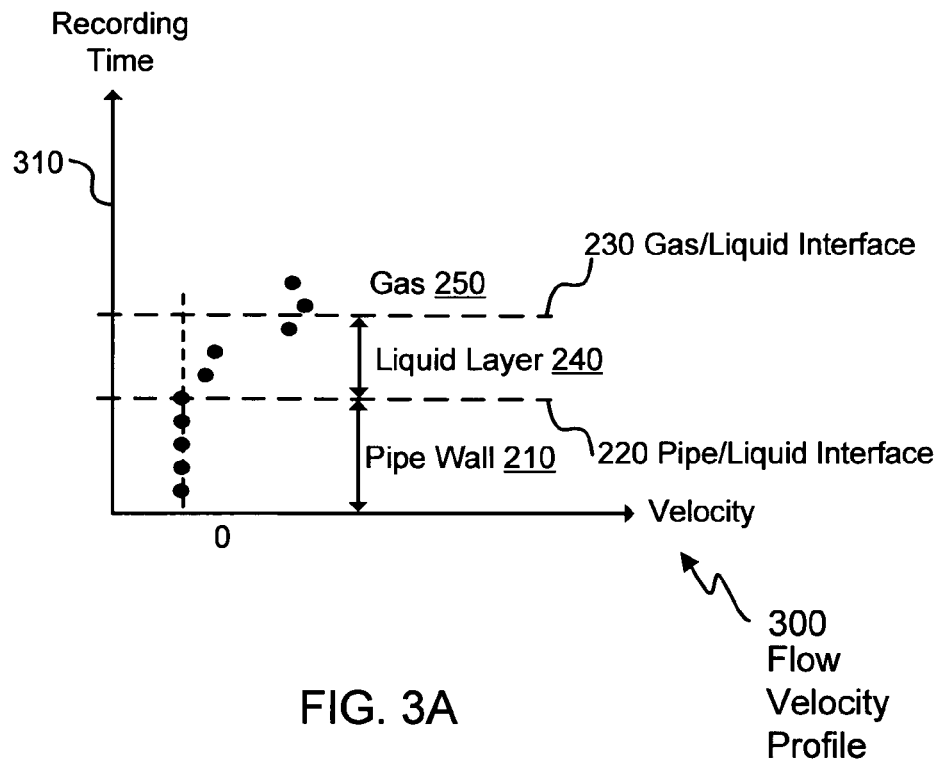
FIGS. 3A and 3B depict a flow velocity profile and a Doppler echo energy profile of embodiments of the flowmeter, in accordance with aspects of the present invention.

Referring next to FIG. 3A, a flow velocity profile 300 is shown. A recording time axis 310 represents the delay time between the emission of a pulse signal and the arrival of a return echo. The lower section of the flow velocity profile 300 with zero velocity corresponds to the regions inside the transducer and pipe wall 210 because there are no moving echo-producing reflectors in these regions. If there are detectable moving echo-producing reflectors such as solid particles, small gas bubbles, or liquid droplets in the liquid layer 240, energies are reflected and a velocity profile across the liquid layer 240 can be produced. It will be appreciated by those skilled in the art that the velocity increases significantly towards the gas/liquid interface 230 because of the drag effect from gas 250 that normally travels faster than the liquid layer 240.

Figure 3B:
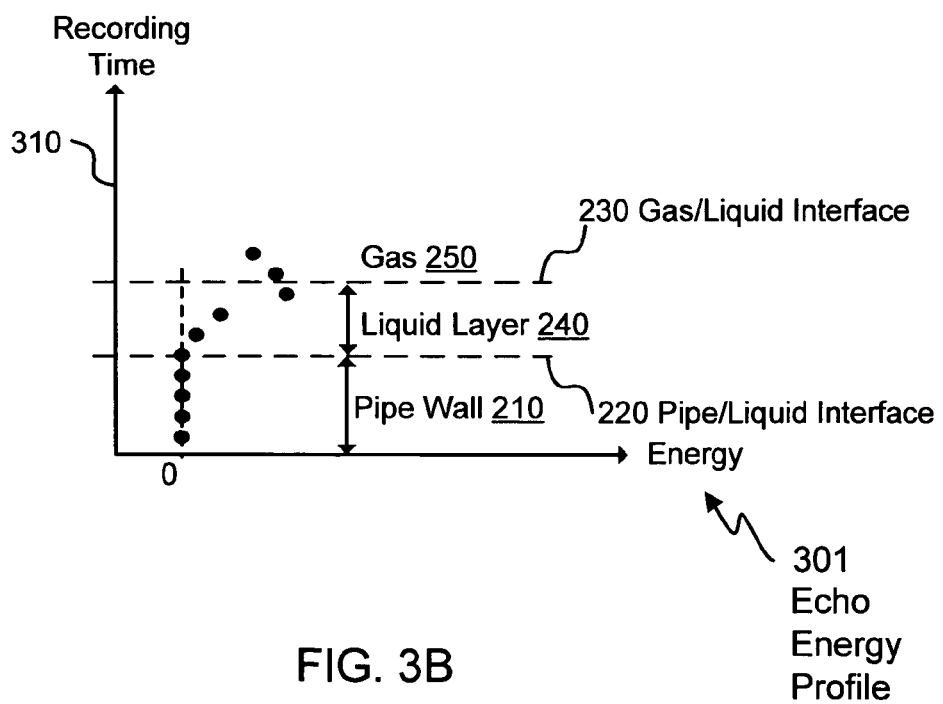

With reference to FIG. 3B, a Doppler echo energy profile 301 is shown. Similar to the flow velocity profile 300 in FIG. 3A, a recording time axis 310 represents the delay time between the emission of a pulse signal and the arrival of a return echo. Likewise, the lower section of the Doppler echo energy profile 301 with zero energy corresponds to the regions inside the transducer and inside the pipe wall 210. Echo-producing reflectors that flow in the liquid layer 240 cause certain levels of energy to be reflected. The energy levels depend on factors such as impedance mismatch between the echo-producing reflectors and the liquid layer 240, or the concentration and size distribution of the echo-producing reflectors in the corresponding sample volume in the liquid layer 240. At the gas/liquid interface 230, the energy level increases dramatically because the gas/liquid interface 230 is a very large reflective surface.

Figure 4:
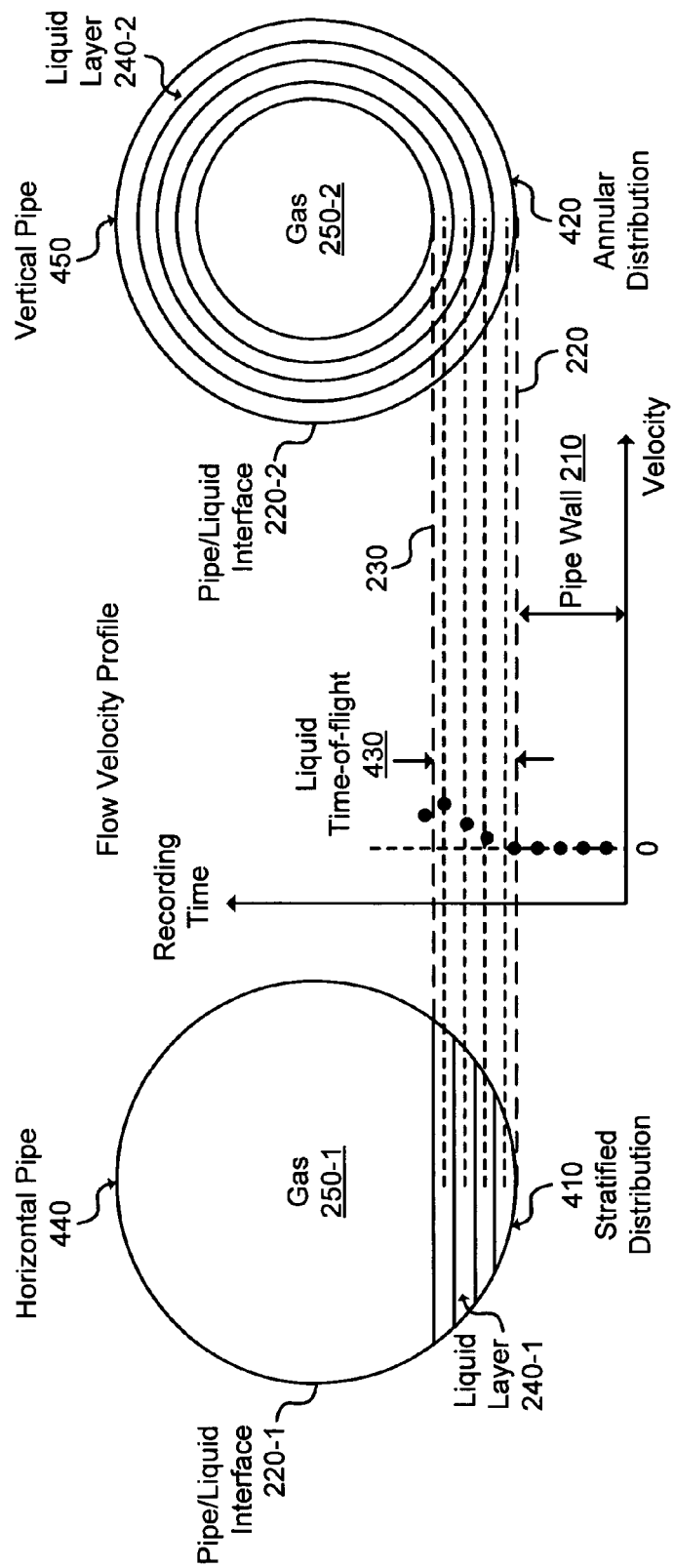
FIG. 4 depicts liquid phase distributions of embodiments of the flowmeter, in accordance with aspects of the present invention.

Referring next to FIG. 4, a horizontal pipe 440 on the left and a vertical pipe 450 on the right are shown. If flow velocity is relatively slow, the horizontal pipe 440 can act as a natural gravity separator that produces a stratified distribution 410 where the liquid layer 240 occupies the lower part of the pipe and gas 250 the upper part. Transducers are configured to be coupled to an underside of the pipe if the pipe is horizontal. With the vertical pipe 450, a flow conditioner may be used to generate an annular distribution 420 with the liquid layer 240 forming an annular flow pattern around the pipe/liquid interface 220, and gas 250 forming a cylindrical pattern at the center of the pipe.

For a stratified distribution 410, the liquid cross-section is divided into sub-areas by parallel horizontal lines. For an annular distribution 420, the liquid cross-section is divided into as many concentric annular-shaped regions as the number of non-zero velocity points on the velocity profile. Accordingly, the time-of-flight in the liquid layer 240, which is designated as the liquid time-of-flight 430, can be determined in this embodiment. The flow rate of the liquid layer 240 can also be determined based on determinations of the area and flow velocity of each section.

In certain aspects, the stratified flow may occur in a generally horizontal pipe or the like. In other aspects of the present invention, the methods and apparatus of the present concept may be used to make determinations, characterization and/or measurements of a swirling flow in a pipe. The concept of characterizing/measuring properties of a swirling flow is described in Applicants co-pending US patent application publication No. US2008/0223146 the entire disclosure of which is herein incorporated for all purposes.

In general, in order to effectively characterize a multiphase flow, it is helpful if the multiphase fluid mixture exhibits a predetermined type of flow. For example, if it is known that the mixture is e.g. stratified, churning, or homogenized, appropriate adjustments can be made to relations used in the calculation/characterization of the fluid and/or a fluid flow rate. As such, in embodiments of the present invention, the mixture may be conditioned to exhibit swirling flow, which separates the liquid from the gas. For example, the conduit may have a swirl element, such as a helical insert or vane assembly, for inducing the mixture to exhibit swirling flow. The swirl element may include one or more spiral-shaped members extending along the conduit in the direction of fluid flow. Preferably, the spiral shaped members are positioned at the wall of the conduit and, when viewed along the axis the conduit, leave a central core of the conduit unimpeded (i.e. they do not extend radially inwards as far as the central axis of the conduit). Alternatively, the swirl element may be formed by a tangential flow inlet to the conduit.

An advantage of swirling flow is that it is relatively easy to induce and sustain (unlike stratified or homogenized flow which may be unstable over typical measurement distances). Further, modeling the characteristics of swirling flow through a Venturi is relatively straightforward, compared to modeling stratified or churning flow, for example. Also, swirling flow is generally symmetrical about the flow axis, resulting in certain measurements of the flow being independent of angular orientation.

Inducing the mixture to exhibit swirling flow separates the liquid and gas phases of the mixture. The swirling flow causes the liquid of the mixture to be displaced to the wall of the conduit, e.g. to form an annulus of liquid adjacent the wall of the conduit, leaving a gas core at the center of the conduit.

Figure 5A:
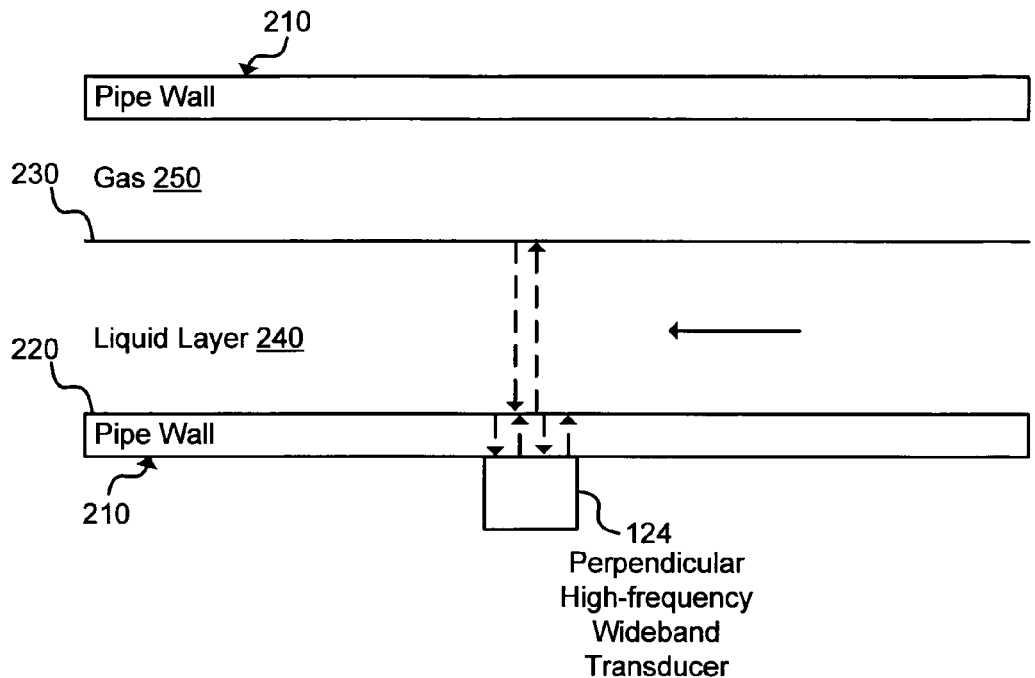
FIGS. 5A and 5B depict a functional diagram and a response of a perpendicular high-frequency transducer of embodiments of the flowmeter, in accordance with aspects of the present invention.
Figure 5B:
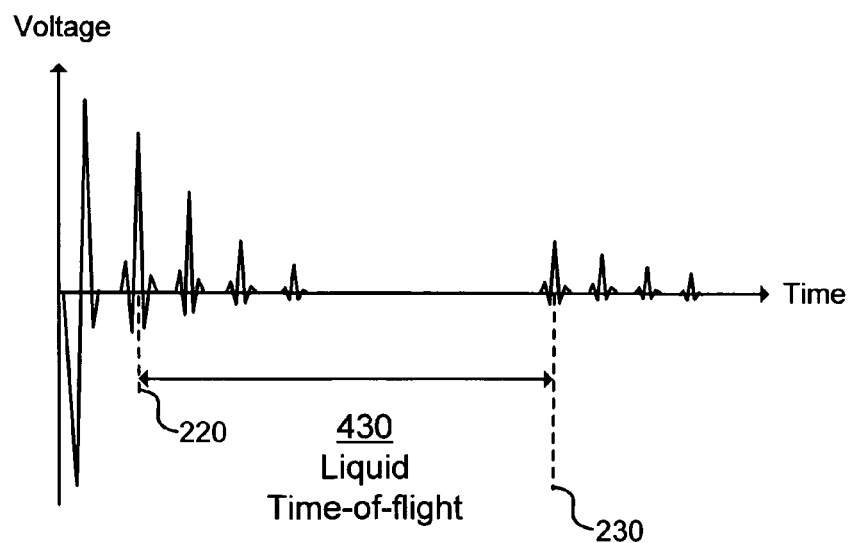

With reference to FIGS. 5A and 5B, a perpendicular high-frequency pulse-echo measurement diagram and its response are shown. The diagram in FIG. 5A shows a perpendicular high-frequency wideband transducer 124 that emits energy into the pipe wall 210. In response, some energy is reflected back from the pipe/liquid interface 220 and the remaining energy is emitted into the liquid layer 240. Some energy is then reflected back from the gas/liquid interface 230.

The response is shown on a voltage versus time graph in FIG. 5B. The time difference between receiving the first energy as reflected from the pipe/liquid interface 220 and receiving the first energy as reflected from the gas/liquid interface 230 is the time-of-flight in the liquid layer 240, which is designated as the liquid time-of-flight 430. This time-of-flight determination is absent from the effect of flow velocity.

Figure 6A:
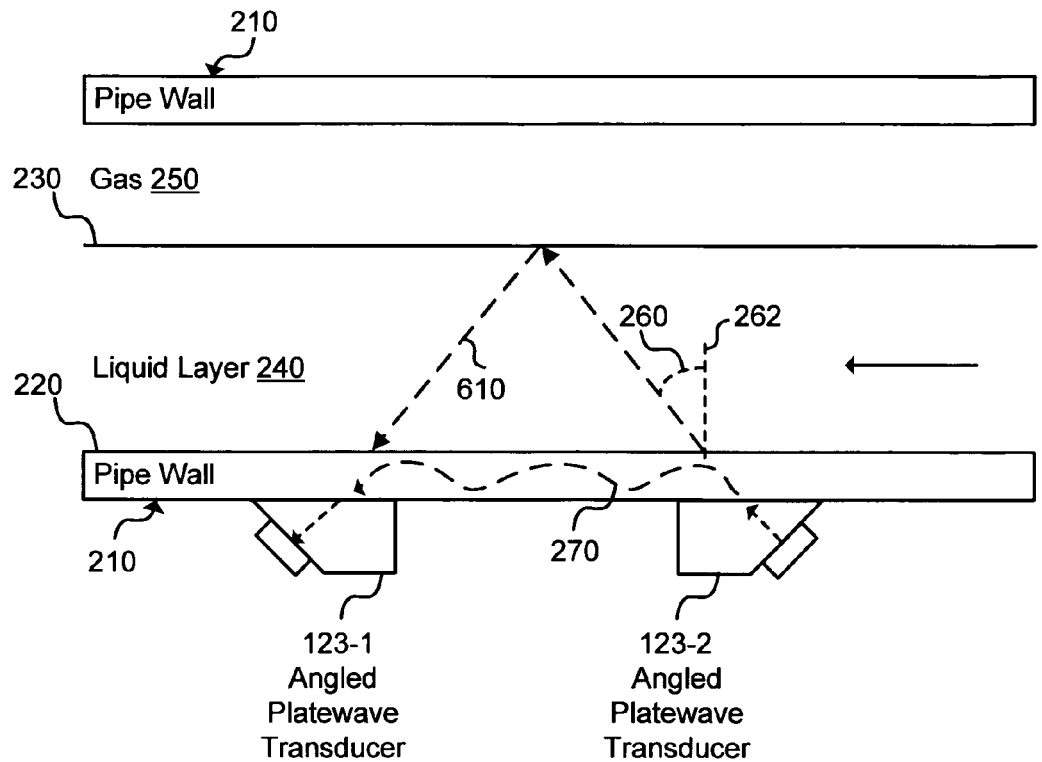
FIGS. 6A and 6B depict a functional diagram and a response of angled platewave transducers of embodiments of the flowmeter, in accordance with aspects of the present invention.
Figure 6B:
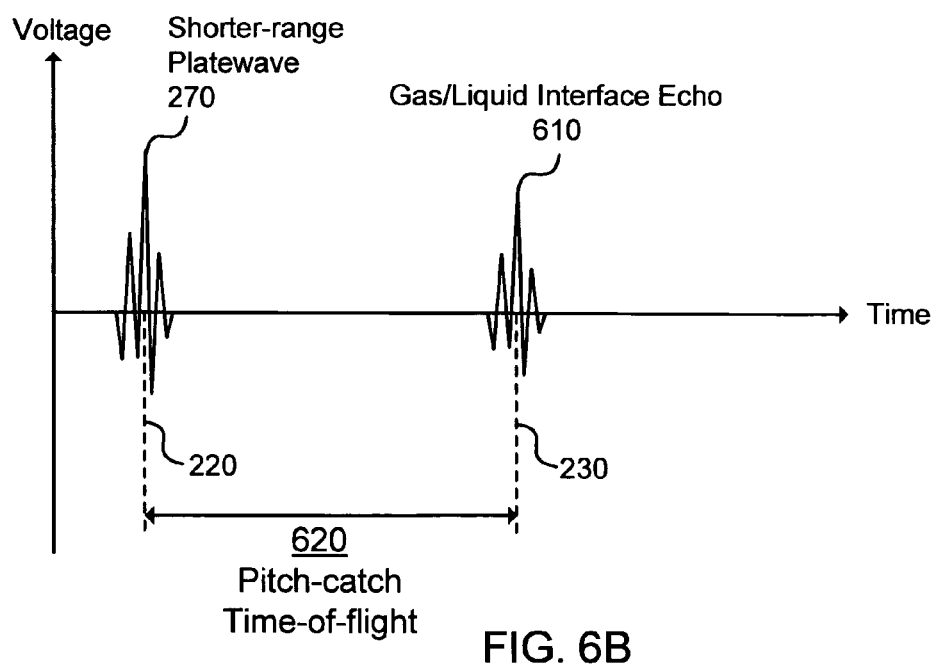

With reference to FIGS. 6A and 6B, an angled platewave measurement diagram and its response are shown. The diagram in FIG. 6A shows a first angled platewave transducer 123-1 operating as a receiver, and a second angled platewave transducer 123-2 producing a shorter-range platewave 270 that travels in the same direction as the flow of the liquid layer 240. In response, as the shorter-range platewave 270 travels along the pipe wall 210, ultrasound energy is emitted into the liquid layer 240 at an incident angle 260 and is reflected back from the gas/liquid interface 230 as a gas/liquid interface echo 610. The incident angle 260 is defined with respect to the straight line 262 that is perpendicular to the interior pipewall at the pipe/liquid interface 220. The absolute value of the incident angle 260 in the liquid layer 240 is generally at least 3 degrees and at most 80 degrees. It will be appreciated by those skilled in the art that other incident angles 260 may be used in various embodiments, such as at least 45 degrees and at most 70 degrees, at least 7 degrees and at most 58 degrees, and at least 58 degrees and at most 80 degrees.

The response is shown on a voltage versus time graph in FIG. 6B. The time difference between receiving the shorter-range platewave 270 and receiving the gas/liquid interface echo 610 at the first angled platewave transducer 123-1 is the time-of-flight in the liquid layer 240. This time-of-flight is designated as the pitch-catch time-of-flight 620. Subsequently, the second platewave transducer 123-2 operates as a receiver and the first platewave transducer 123-1 generates an excitation pulse, producing a platewave propagating in a direction opposite to what is shown in FIG. 6A. Hence, two time-of-flight determinations, one being a pitch-catch time-of-flight 620-1 when traveling with the flow of the liquid layer 240 and one being a pitch-catch time-of-flight 620-2 when traveling against the flow of the liquid layer 240, can be determined.

Figure 7:
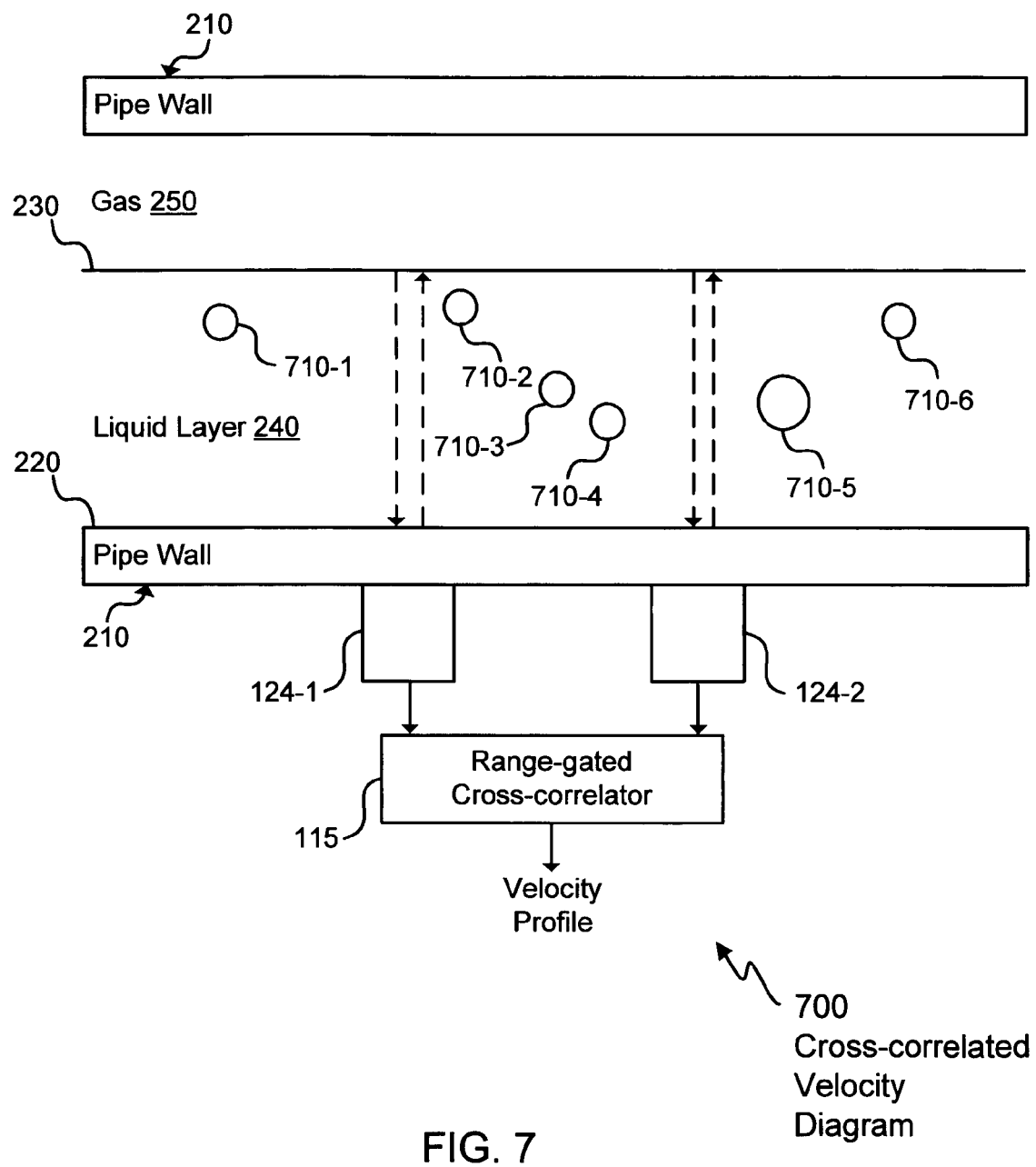
FIG. 7 depicts a functional diagram for a cross-correlated velocity profile of embodiments of the flowmeter, in accordance with aspects of the present invention.

With reference to FIG. 7, a cross-correlated velocity measurement diagram 700 is shown. Perpendicular high-frequency transducers 124 each emits pulsed energy into the liquid layer 240 and receives echo energies back. The echo energies may be reflected back by echo-producing reflectors 710 that are present at different depth levels in the liquid layer 240. Examples of echo-producing reflectors 710 may include solid particles, small gas bubbles, or liquid droplets that cause energy to be reflected because of impedance mismatch between the echo-producing reflectors and the liquid layer 240. A range-gated cross-correlator 115 first selects energies reflected from different depth levels, then, at each range-gate depth, cross-correlates between the energies received by the two transducers to produce a velocity profile of the liquid layer 240.

Figure 8A:
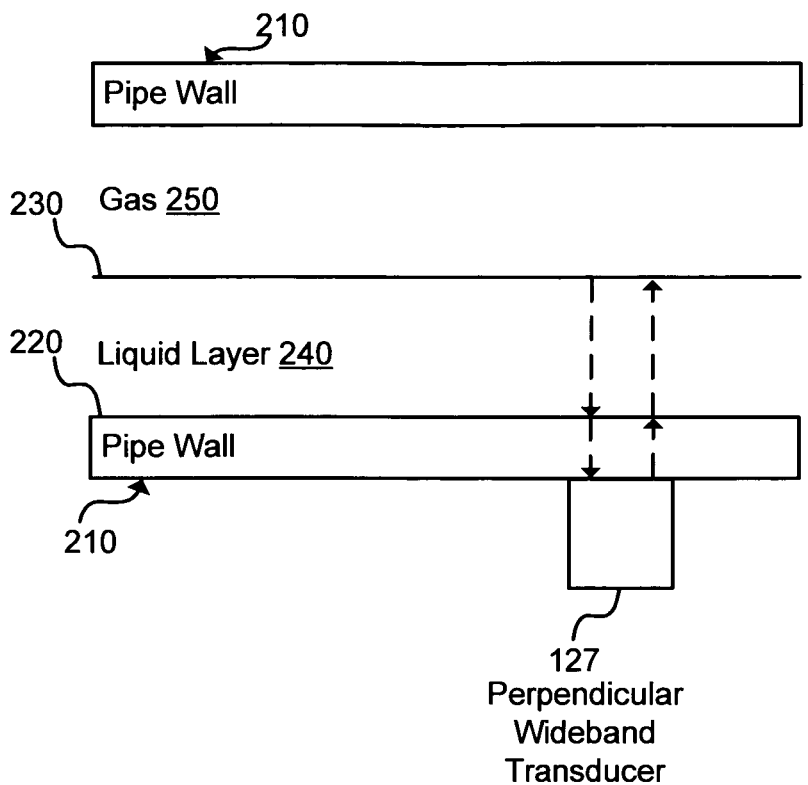
FIG. 8A and FIG. 8B depict a functional diagram and a response of a time-domain pulse-echo method of embodiments of the flowmeter.
Figure 8B:
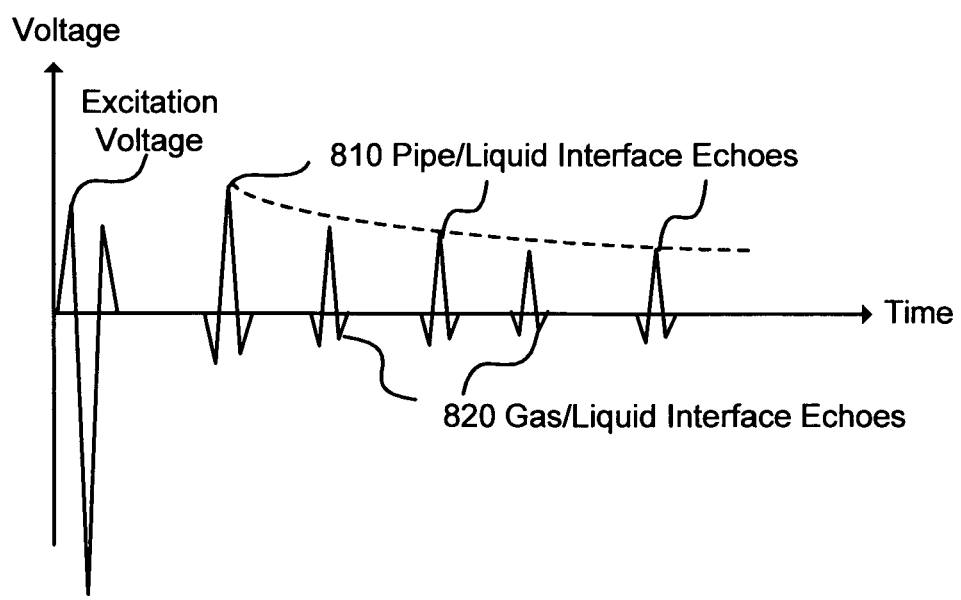

Referring next to FIGS. 8A and 8B, a time-domain pulse-echo measurement diagram and its response are shown. Similar to the aforementioned perpendicular high-frequency wideband transducer 124 in FIG. 7, the diagram in FIG. 8A shows a perpendicular wideband transducer 127 that emits pulsed energy into the pipe wall 210. In response, some energy is reflected back from the pipe/liquid interface 220 and the remaining energy is emitted into the liquid layer 240. Some energy is then reflected back from the gas/liquid interface 230.

Multiple echoes are in fact reflected from each interface. For example, when energy is reflected back from the pipe/liquid interface 220, some of the energy is then further reflected back toward the pipe/liquid interface 220 from the exterior of the pipe wall 210. Such multiple echoes are designated as the pipe/liquid interface echoes 810. Likewise, when energy is reflected back from the gas/liquid interface 230, some of the energy is then further reflected back toward the gas/liquid interface 230 from the pipe/liquid interface 220. Such multiple echoes are designated as the gas/liquid interface echoes 820. Because energy is reflected due to a mismatch in acoustic impedance, the acoustic impedance of the liquid layer 240 can be determined based on the amplitude decay rate of the interface echoes 810.

The response is shown on a voltage versus time graph in FIG. 8B. The fraction of water in the liquid layer 240 can then be determined based on the determination of the acoustic impedance of the liquid layer 240, if acoustic impedance values of the individual components, e.g. oil and water, in liquid layer 240 are known. Additionally, the thickness of the liquid layer 240 can be determined based on the time difference between the arrival of the first echo of the pipe/liquid interface echoes 810 and the arrival of the first echo of the gas/liquid interface echoes 820, if the speed of sound in the liquid layer 240 is known.

Figure 9A:
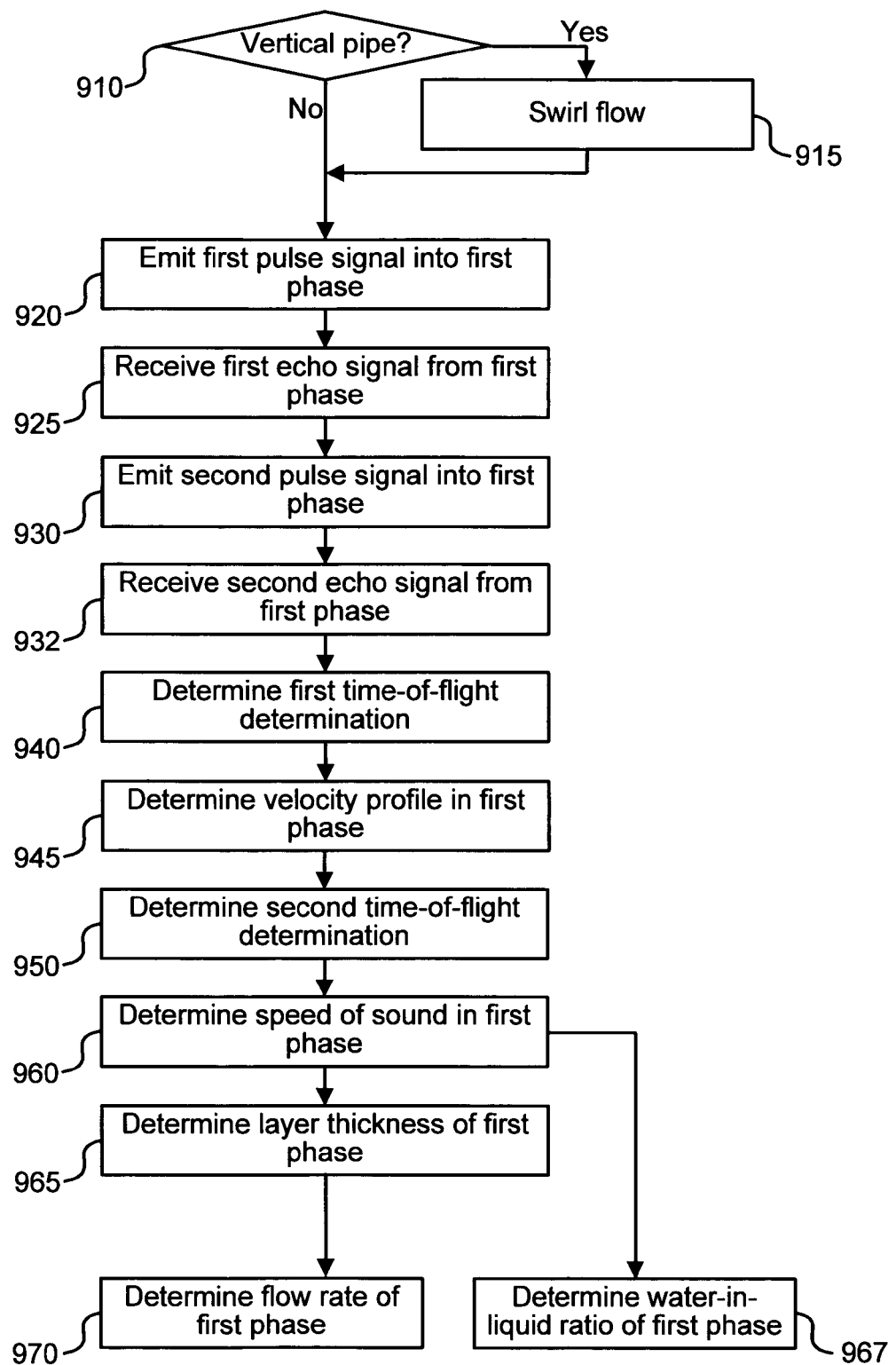
FIG. 9 illustrates a flowchart of an embodiment of a process for determining the flow rate of a liquid phase flowing in a pipe, in accordance with aspects of the present invention.
Figure 9B:
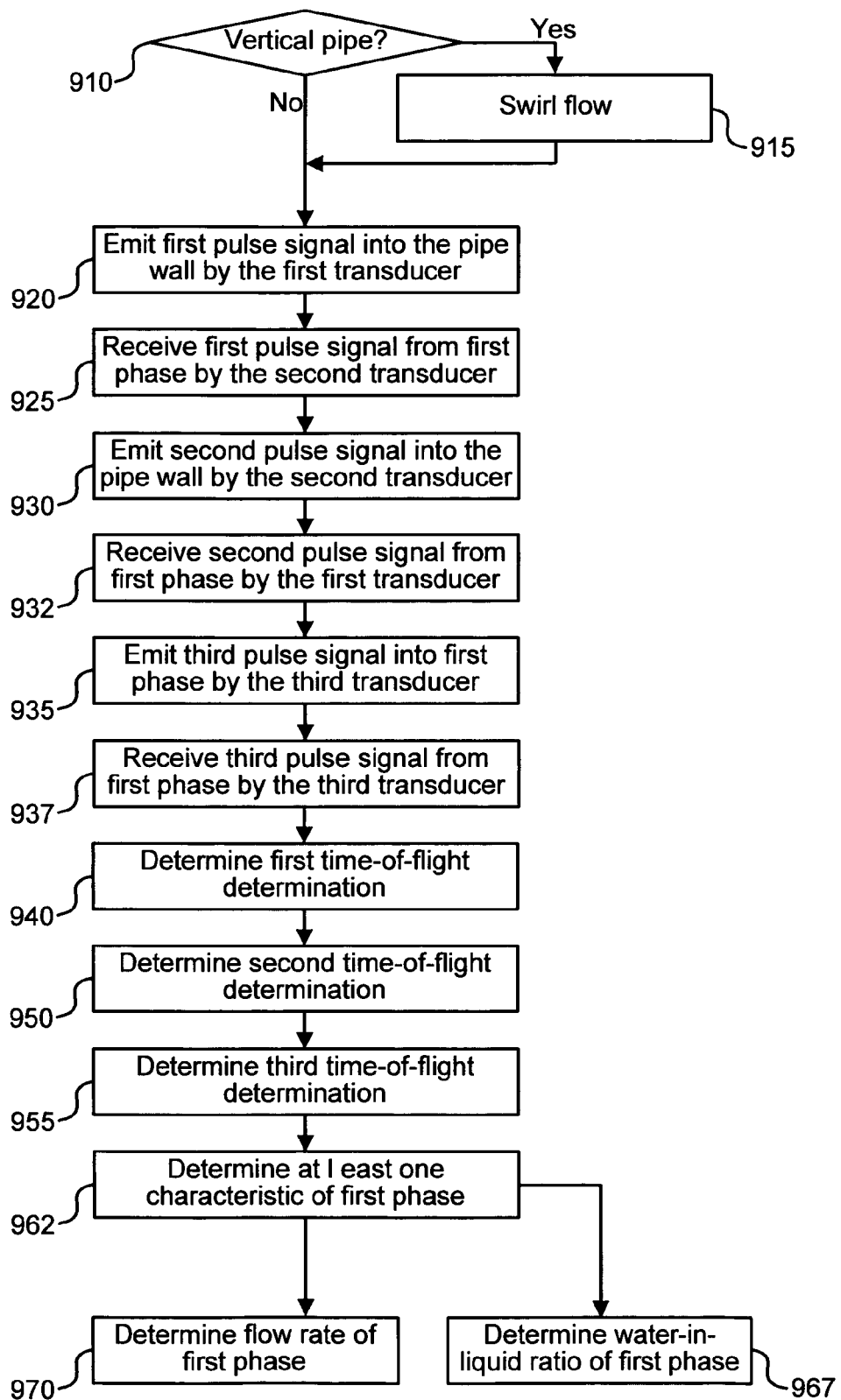

With reference to FIGS. 9A and 9B, an embodiment of a process for determining a flow rate of a first phase as liquid flowing with multiple phases in a pipe is shown. The depicted portion of the process begins in block 910 with an initial determination if the pipe is situated vertically. If so, in some embodiments a multiphase flow is swirled such that the first phase forms an annular-shaped distribution around the pipe wall in block 915.

FIG. 9A generally can be performed with the embodiment in FIG. 1A and FIG. 2A. In block 920, a first pulse signal is emitted into the first phase at a first incident angle with respect to a straight line that is perpendicular to the interior pipe wall and received in block 925. A second pulse signal is also emitted into the first phase at a second incident angle that is substantially zero degree with respect to the straight line that is perpendicular to the interior pipe wall in block 930 and received in block 932. It will be appreciated by those of skill in the art that in certain embodiments, the processes embodied in blocks 920, 925, 930 and 932 may be performed simultaneously or in a different order.

The processing of received pulse signals enables at least two time-of-flight determinations to be determined. In block 940, a first time-of-flight determination is determined. In some embodiments, the determination is based on a plurality of determinations of an energy level of a first returned echo signal from a depth level in the first phase. In other embodiments, the determination is based on a plurality of determinations of a mean flow velocity value that can be derived from a first returned echo signal from a depth level in the first phase. In block 945, a determination of the Doppler liquid velocity profile of the first phase is based on a plurality of determinations of a Doppler frequency shift of a first returned echo signal from a range-gated depth level in the first phase. Similarly, a second time-of-flight determination is determined in block 950. In some embodiments, the determination is based on a plurality of determinations of an energy level of a second returned signal from a range-gated depth level in the first phase. It will also be appreciated by those skilled in the art that in certain embodiments, the processes embodied in block 940 and block 950 may be performed simultaneously or in a different order.

After determining the at least two time-of-flight determinations, a speed of sound in the first phase can be determined in block 960. In some embodiments, the mean axial velocity of the first phase can also be determined from the measured Doppler liquid velocity profile as determined in block 945. From the speed of sound determination, a thickness of the first phase can be determined in block 965. Additionally, the speed of sound determination also enables a water-in-liquid ratio of the first phase as liquid to be determined in block 967. The flow rate of the first phase can then be determined in block 970 from the determinations of the thickness as determined in block 965 and the mean axial velocity as determined in block 945 of the first phase.

In another embodiment, FIG. 9B generally can be performed with the embodiment in FIG. 1B and FIG. 2B. From the first pulse signal generated in the pipe wall and emitted into the first phase at a first incident angle with respect to a straight line that is perpendicular to the interior pipe wall in block 920, a first time-of-flight determination can be determined in block 940 from the received first pulse signal in block 925. Likewise, from the second pulse signal generated in the pipe wall and emitted into the first phase at a second incident angle substantially mirrored to the first incident angle in block 930, a second time-of-flight determination can be determined in block 950 from the received second pulse signal in block 932; from the third pulse signal emitted into the first phase at a third incident angle that is substantially zero degree in block 935, a third time-of-flight determination can be determined in block 955 from the received third pulse signal in block 937. At least one characteristic of the first phase can then be determined based on the first time-of-flight determination, the second time-of-flight determination, and the third time-of-flight determination in block 962. Some of these characteristics may include the speed of sound, thickness, and mean flow velocity of the first phase as liquid. The flow rate of the first phase is then determined in block 970. Additionally, the speed of sound determination also enables a water-in-liquid ratio of the first phase as liquid to be determined in block 967.

A number of variations and modifications of the disclosed embodiments can also be used. For example, the multiple phases that are present in the pipe may include lighter and heavier gasses, other types of liquid, or a mixture of liquid types. Other types of liquid may include water, syrup, alcohol, blood, gasoline, or various types of oil. The liquid may be relatively dirty or relatively clean, and may also be relatively placid or relatively turbulent.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A multiphase flowmeter for determining at least one characteristic of a first phase flowing in a pipe, wherein at least a second phase is also present in the pipe, the multiphase flowmeter comprising:
    a first transducer configured to emit a first pulse signal into the first phase at a first incident angle with respect to a straight line that is perpendicular to an interior pipe wall, the first pulse signal being in an ultrasonic range, wherein:
        the first transducer is configured to be coupled to an exterior pipe wall; and
        the absolute value of the first incident angle in the first phase is configured to be at least 10 degrees and at most 80 degrees; and
        the first pulse signal and a first return echo signal produced by the first pulse signal and received by the first transducer are used to determine a first time-of-flight;
    a second transducer configured to emit a second pulse signal into the first phase at a second incident angle with respect to the straight line that is perpendicular to the interior pipe wall, the second pulse signal being in the ultrasonic range, wherein:
        the second transducer is configured to be coupled to the exterior pipe wall; and
        the absolute value of the second incident angle in the first phase is configured to be less than 10 degrees, whereby the absolute value of the second incident angle is configured to have a substantially normal incidence;
        the second pulse signal and a second return echo signal produced by the second pulse signal and received by the second transducer are used to determine a second time-of-flight; and
    a processor configured to process a speed of sound in the first phase from the first and the second time-of-flight and to process the at least one characteristic of the first phase using the processed speed of sound.

2. The multiphase flowmeter for determining at least one characteristic of the first phase flowing in the pipe of claim 1, further comprising:
    a third transducer configured to emit a third pulse signal into the first phase at a third incident angle with respect to the straight line that is perpendicular to the interior pipe wall, the third pulse signal being in an ultrasonic range, wherein:
        the third transducer is configured to be coupled to the exterior pipe wall;
        the third transducer is further configured such that: the third transducer receives the first pulse signal; and the first transducer receives the third pulse signal; and
        the absolute value of the third incident angle in the first phase is configured to be at least 10 degrees and at most 80 degrees.

3. The multiphase flowmeter for determining at least one characteristic of the first phase flowing in the pipe of claim 2, wherein the at least one characteristic of the first phase is determined based on at least three time-of-flight determinations.

4. The multiphase flowmeter for determining at least one characteristic of the first phase flowing in the pipe of claim 2, wherein the absolute value of the third incident angle in the first phase is configured to be at least 15 degrees and at most 60 degrees.

5. The multiphase flowmeter for determining at least one characteristic of the first phase flowing in the pipe of claim 2, wherein:
    the first transducer is configured to generate a first excitation energy at least 50 kHz and at most 1 MHz in frequency in a pipe wall; and
    the third transducer is configured to generate a second excitation energy at least 50 kHz and at most 1 MHz in frequency in the pipe wall.

6. The multiphase flowmeter for determining at least one characteristic of the first phase flowing in the pipe of claim 1, wherein:
    the at least one characteristic of the first phase comprises a flow rate of the first phase; and
    the flow rate of the first phase is determined based on a determination of a mean flow velocity and a layer thickness of the first phase.

7. The multiphase flowmeter for determining at least one characteristic of the first phase flowing in the pipe of claim 6, wherein the mean flow velocity in the first phase is determined based on the at least two time-of-flight determinations.

8. The multiphase flowmeter for determining at least one characteristic of the first phase flowing in the pipe of claim 1, wherein:
    the pipe is a vertical pipe;
    the first transducer is configured to be coupled to the vertical pipe; and
    the second transducer is configured to be coupled to the vertical pipe.

9. The multiphase flowmeter for determining at least one characteristic of the first phase flowing in the pipe of claim 8, further comprising:
    a flow conditioner that generates an annular flow pattern such that the first phase forms an annular-shaped distribution around an interior pipe wall of the vertical pipe.

10. The multiphase flowmeter for determining at least one characteristic of the first phase flowing in the pipe of claim 1, wherein:
    the at least one characteristic of the first phase comprises a thickness of the first phase.

11. The multiphase flowmeter for determining at least one characteristic of the first phase flowing in the pipe of claim 1, wherein:
    the pipe is a horizontal pipe;
    the first transducer is configured to be coupled to an underside of the horizontal pipe; and
    the second transducer is configured to be coupled to the underside of the horizontal pipe.

12. The multiphase flowmeter for determining at least one characteristic of the first phase flowing in the pipe of claim 1, wherein:

the first transducer is configured to be removably coupled to the exterior pipe wall; and the second transducer is configured to be removably coupled to the exterior pipe wall.

13. The multiphase flowmeter for determining at least one characteristic of the first phase flowing in the pipe of claim 1, wherein the absolute value of the first incident angle in the first phase is configured to be at least 15 degrees and at most 60 degrees.

14. The multiphase flowmeter for determining at least one characteristic of the first phase flowing in the pipe of claim 1, wherein the absolute value of the second incident angle in the first phase is configured to be less than 5 degrees.

15. The multiphase flowmeter for determining at least one characteristic of the first phase flowing in the pipe of claim 1, wherein:

the first time-of-flight determination is based on a flow velocity profile and/or on a first Doppler echo energy profile of the first phase; and the second time-of-flight determination is based on a second Doppler echo energy profile of signals returned from a plurality of depth levels of the first phase.

* * * * *